United States Patent
Zhang et al.

(10) Patent No.: US 10,355,450 B2
(45) Date of Patent: Jul. 16, 2019

(54) SYSTEM AND METHOD OF REDUCING SPECKLE FOR AN ILLUMINATOR

(71) Applicant: INTEL CORPORATION, Santa Clara, CA (US)

(72) Inventors: Haibo Zhang, Hillsboro, OR (US); Richmond Hicks, Aloha, OR (US); Khaled Ahmed, Anaheim, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/807,953

(22) Filed: Nov. 9, 2017

(65) Prior Publication Data
US 2018/0131160 A1    May 10, 2018

Related U.S. Application Data

(63) Continuation-in-part of application No. 15/793,795, filed on Oct. 25, 2017.

(60) Provisional application No. 62/420,448, filed on Nov. 10, 2016.

(51) Int. Cl.
| | |
|---|---|
| H01S 5/42 | (2006.01) |
| H01S 5/10 | (2006.01) |
| H01S 5/183 | (2006.01) |
| H01S 5/042 | (2006.01) |
| H01S 5/026 | (2006.01) |
| H01S 5/022 | (2006.01) |
| G06K 9/20 | (2006.01) |
| H01S 5/062 | (2006.01) |
| G06F 21/32 | (2013.01) |

(Continued)

(52) U.S. Cl.
CPC .......... *H01S 5/1092* (2013.01); *G06K 9/2036* (2013.01); *H01S 5/0226* (2013.01); *H01S 5/0265* (2013.01); *H01S 5/0428* (2013.01); *H01S 5/0622* (2013.01); *H01S 5/183* (2013.01); *H01S 5/18386* (2013.01); *G06F 21/32* (2013.01); *G07C 9/00158* (2013.01); *H01S 5/02296* (2013.01); *H01S 5/18388* (2013.01); *H01S 5/4087* (2013.01); *H01S 5/423* (2013.01)

(58) Field of Classification Search
CPC ........ H01S 5/1092; H01S 5/423; H01S 5/062; G01S 17/89
See application file for complete search history.

(56) References Cited

U.S. PATENT DOCUMENTS

| | | | | |
|---|---|---|---|---|
| 2010/0069727 | A1* | 3/2010 | Kawano | A61B 5/0261 600/310 |
| 2011/0317130 | A1* | 12/2011 | Gollier | G02B 27/48 353/20 |

(Continued)

OTHER PUBLICATIONS

Chang, et al., "Algorithm based on rigorous coupled-wave analysis for diffractive optical element design", Journal of the Optical Society of America A; vol. 18, Issue 10; pp. 2491-2501; 2001.

(Continued)

*Primary Examiner* — Michael Carter
(74) *Attorney, Agent, or Firm* — Green, Howard & Mughal LLP.

(57) ABSTRACT

A system and method of reducing speckle for an illuminator comprises driving current at varying levels or average frequency to provide varying light wavelengths.

25 Claims, 16 Drawing Sheets

1300

EMIT LIGHT FROM AN ILLUMINATOR HAVING A LIGHT SOURCE WITH AT LEAST ONE VERTICAL-CAVITY SURFACE EMITTING LASER (VCSEL) 1302

↓

DRIVE CURRENT THROUGH THE ILLUMINATOR TO GENERATE LIGHT WITH AT LEAST TWO OUTPUT DOMINANT LIGHT WAVELENGTHS BEING SUFFICENTLY MAINTAINED AND SUFFICIENTLY DIFFERENT TO EACH OTHER TO REDUCE SPECKLE ON AN IMAGE TO BE FORMED BY USING THE LIGHT FROM THE AT LEAST ONE VCSEL
1304

(51) Int. Cl.
  *G07C 9/00* (2006.01)
  *H01S 5/40* (2006.01)

(56) References Cited

U.S. PATENT DOCUMENTS

| | | | |
|---|---|---|---|
| 2013/0194787 A1* | 8/2013 | Geske | H01S 5/4087 362/157 |
| 2013/0201347 A1 | 8/2013 | Coulon et al. | |
| 2014/0376220 A1 | 12/2014 | Shen et al. | |
| 2015/0130903 A1* | 5/2015 | Thompson | H01S 5/0651 348/46 |
| 2017/0082263 A1 | 3/2017 | Byrnes et al. | |
| 2018/0275321 A1 | 9/2018 | Kamali et al. | |

OTHER PUBLICATIONS

Gerchberg, et al., "A practical algorithm for the determination of phase from image and diffraction plane pictures", Optik 35, pp. 227-246; 1972.

Gu, B. et al., "General theory for performing an optical transform", Applied Optics; vol. 25, No. 18, Sep. 15, 1986.

Leshin, J. et al., "Lithographic VCSEL Array Mulitmode and Single Mode Sources for Sensing and 3D Imaging", Proc. of SPIE; vol. 9854, 9854Y, 2016.

Yang, et al., "Gerchberg-Saxton and Yang-Gu algorithms for phase retrieval in a nonunitary transform system: a comparison", Applied Optics; vol. 33, No. 2; pp. 209-218; Jan. 10, 1994.

Yang, G. et al., "On the amplitude-phase retrieval problem in the optical system", Acta Phys. Sin. 30; pp. 410-413; 1981. English Abstract Only.

MAX3735A Laser Driver Output Configurations, Part 4: Driving VCSELs, Design Note: HFDN-26.3; Rev.1; Apr. 2008; 8 pages.

Beatty "Lasers: What is Coherent Light?", downloaded on Jan. 31, 2018 from http://amasci.com/miscon/coherenc.html, 2004.

Yu, N. et al. "Flat optics with designer metasurfaces", Pubd Online: Jan. 23, 2014 | DOI: 10.1038/NMAT3839; Nature Materials,vol. 13,Feb. 14, 12 pages.

Office Action for U.S. Appl. No. 15/793,795, dated Mar. 8, 2019.

* cited by examiner

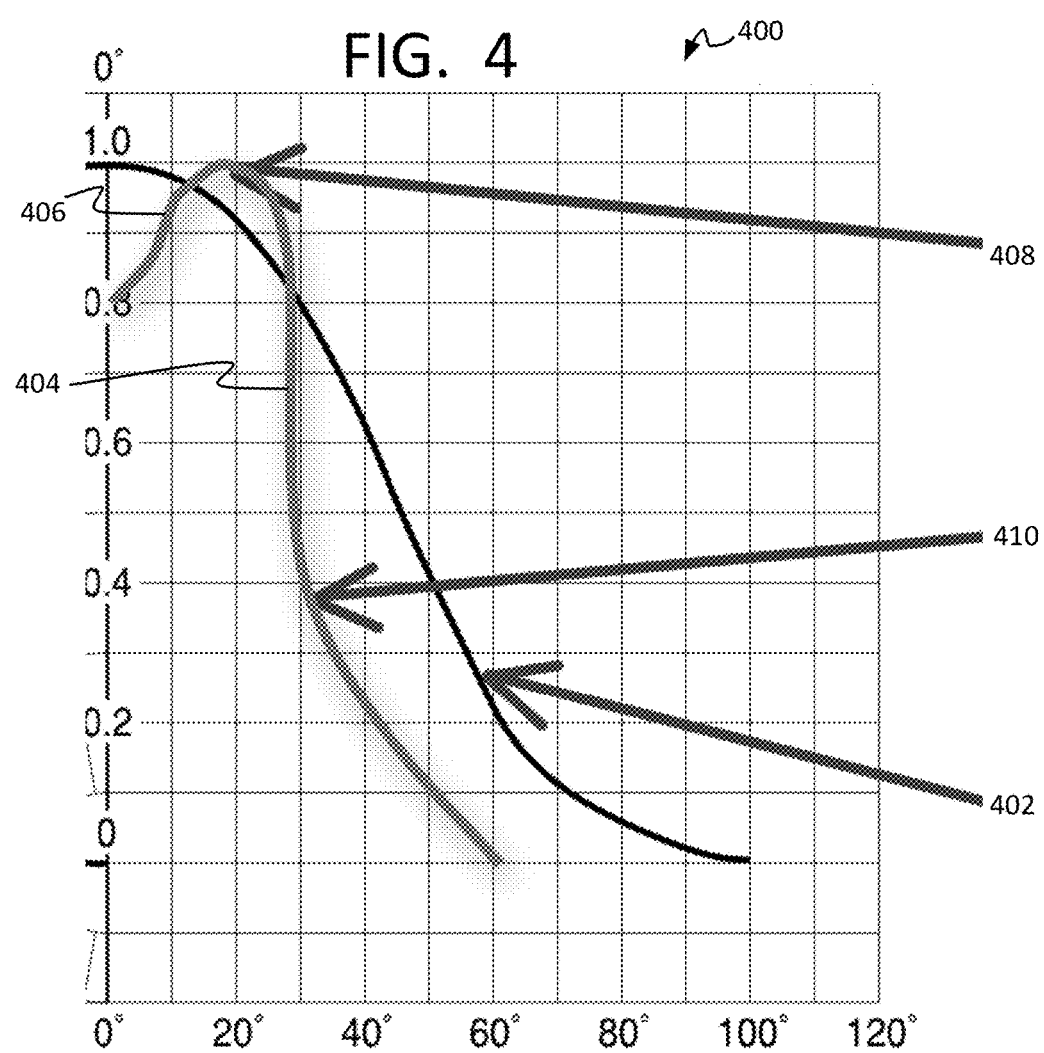

802

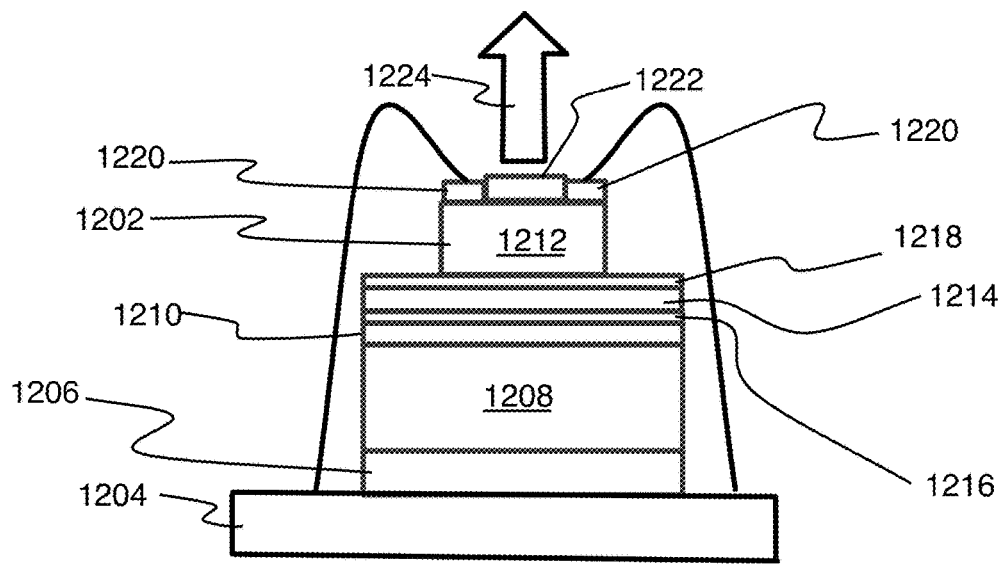

EMIT LIGHT FROM AN ILLUMINATOR HAVING A LIGHT SOURCE WITH AT LEAST ONE VERTICAL-CAVITY SURFACE EMITTING LASER (VCSEL) 1302

DRIVE CURRENT THROUGH THE ILLUMINATOR TO GENERATE LIGHT WITH AT LEAST TWO OUTPUT DOMINANT LIGHT WAVELENGTHS BEING SUFFICENTLY MAINTAINED AND SUFFICIENTLY DIFFERENT TO EACH OTHER TO REDUCE SPECKLE ON AN IMAGE TO BE FORMED BY USING THE LIGHT FROM THE AT LEAST ONE VCSEL
1304

```
┌─────────────────────────────────────────────────────────┐
│  EMIT LIGHT FROM AN ILLUMINATOR COMPRISING A LIGHT      │
│  SOURCE HAVING AT LEAST ONE VERTICAL-CAVITY SURFACE     │
│            EMITTING LASER (VCSEL)                       │
│                     1402                                │
│  ┌ ─ ─ ─ ─ ─ ─ ─ ─ ─ ─ ─ ─ ─ ─ ─ ─ ─ ─ ─ ─ ─ ─ ─ ─ ┐   │
│    EMIT LIGHT THROUGH A METASURFACE TO DIRECT A         │
│  │ WAVEFRONT RADIATION INTO A PREDETERMINED         │   │
│                   PATTERN 1403                          │
│  └ ─ ─ ─ ─ ─ ─ ─ ─ ─ ─ ─ ─ ─ ─ ─ ─ ─ ─ ─ ─ ─ ─ ─ ─ ┘   │
└─────────────────────────────────────────────────────────┘
                           │
                           ▼
┌─────────────────────────────────────────────────────────┐
│   DRIVE CURRENT THROUGH THE ILLUMINATOR TO GENERATE     │
│                     LIGHT 1404                          │
│  ┌ ─ ─ ─ ─ ─ ─ ─ ─ ─ ─ ─ ─ ─ ─ ─ ─ ─ ─ ─ ─ ─ ─ ─ ─ ┐   │
│    VARY THE CURRENT TO FORM AT LEAST TWO LIGHT          │
│  │ WAVELENGTHS THAT ARE SUFFICENTLY DIFFERENT      │   │
│     FROM EACH OTHER TO REDUCE SPECKLE 1406              │
│  └ ─ ─ ─ ─ ─ ─ ─ ─ ─ ─ ─ ─ ─ ─ ─ ─ ─ ─ ─ ─ ─ ─ ─ ─ ┘   │
│                                                         │
│  ┌ ─ ─ ─ ─ ─ ─ ─ ─ ─ ─ ─ ─ ─ ─ ─ ─ ─ ─ ─ ─ ─ ─ ─ ─ ┐   │
│     DRIVE THE CURRENT IN PULSES WITH DIFFERENT          │
│  │           CURRENT LEVELS 1408                   │   │
│  └ ─ ─ ─ ─ ─ ─ ─ ─ ─ ─ ─ ─ ─ ─ ─ ─ ─ ─ ─ ─ ─ ─ ─ ─ ┘   │
│                                                         │
│  ┌ ─ ─ ─ ─ ─ ─ ─ ─ ─ ─ ─ ─ ─ ─ ─ ─ ─ ─ ─ ─ ─ ─ ─ ─ ┐   │
│     DRIVE THE CURRENT IN PULSES AT DIFFERENT            │
│  │ FREQUENCIES TO FORM DIFFERING AVERAGE           │   │
│    FREQUENCIES SUFFICIENTLY DIFFERENT TO REDUCE         │
│  │              SPECKLE 1410                       │   │
│  └ ─ ─ ─ ─ ─ ─ ─ ─ ─ ─ ─ ─ ─ ─ ─ ─ ─ ─ ─ ─ ─ ─ ─ ─ ┘   │
│                                                         │
│  ┌ ─ ─ ─ ─ ─ ─ ─ ─ ─ ─ ─ ─ ─ ─ ─ ─ ─ ─ ─ ─ ─ ─ ─ ─ ┐   │
│       DRIVE THE CURRENT BY BOTH VARYING THE             │
│  │ CURRENT LEVEL AND VARYNG THE FREQUENCY OF       │   │
│     PULSES TO FORM AT LEAST TWO WAVELENGTHS             │
│  │ SUFFICIENTLY DIFFERENT TO REDUCE SPECKLE 1412   │   │
│  └ ─ ─ ─ ─ ─ ─ ─ ─ ─ ─ ─ ─ ─ ─ ─ ─ ─ ─ ─ ─ ─ ─ ─ ─ ┘   │
└─────────────────────────────────────────────────────────┘
```

SYSTEM AND METHOD OF REDUCING SPECKLE FOR AN ILLUMINATOR

CLAIM OF PRIORITY

This patent application is a continuation-in-part application of U.S. patent application Ser. No. 15/793,795, filed Oct. 25, 2017, titled A META ILLUMINATOR. Both this application and U.S. patent application Ser. No. 15/793,795 claim the benefit of U.S. Provisional Patent Application No. 62/420,448, filed Nov. 10, 2016, and titled INFRARED ILLUMINATORS, CAMERAS, AND BIOMETRIC DETECTION AND LOGIN SYSTEMS. U.S. Provisional Patent Application No. 62/420,448 and U.S. patent application Ser. No. 15/793,795 are both fully incorporated herein for all purposes.

BACKGROUND

Projectors or illuminators are often used to project infrared light (about 700 to 2500 nm wavelength for near-infrared (NIR) onto an object and then use a sensor (or camera) to detect the light reflecting from the object in order to form images of the object. The images then may be used for a number of applications including biometric detection for security authorization purposes such as with face detection or iris scanning recognition. These detection systems may be used to authorize a user to unlock many different objects such as physical doors, computers, computer files, or other electronic devices to name a few examples. Such NIR systems also may be used for eye tracking and other object detection operations such as with motion detection related-games or artificial intelligence (AI), computer vision, and so forth. In these systems, the sensed reflections from the NIR illuminator are used to form an IR or NIR image with specific characteristics needed to perform the desired detection or to use the image for other applications. The cameras that generate images of a user's face to use the image to authorize access to something may be referred to herein as a face login camera.

The conventional NIR illuminator devices use LED illuminators. These conventional illuminators, however, often suffer from a loss of IR signal towards the edges and corners of the image due to fall off (e.g., reduced radiation intensity) of the illuminator, lens shading, image sensor aperture limitations (where the aperture at the camera sensor is not wide enough to capture sufficient light near the edges of the aperture), and angular effects of the IR band pass filter at the sensor (or camera) that permit too much ambient light into the camera. At the same time, the center of the image may be too bright (too much light intensity or radiation) due to too much concentration of light at the center of the image, and so much so that the center of the image may be washed out by the light intensity.

Attempts to compensate for these difficulties are conventionally performed by using digital gain (or in other words, lens shading correction for example) when the IR image is analyzed, displayed, and/or used to provide data to improve an RGB or RGBD (depth) image for example. However, for those applications that typically and automatically analyze signal-to-noise ratio (SNR) on an image, such as with face detection for example, the loss of IR signal also corresponds to a loss of SNR in the corners and edges of the image, causing some systems to fail to meet performance needs of the application. Thus, while the digital gain adjustments may adjust for the extreme high and low light intensity areas on the image providing adequate light intensity values for those areas, the digital gain adjustments cannot compensate for the loss of SNR.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 4 is a far-field radiation emission distribution graph showing conventional and proposed radiation distribution patterns according to at least one of the implementations herein;

FIG. 12 is a cross-sectional side view of a vertical cavity semiconductor emitting laser (VCSEL) with a metalayer in accordance with at least one of the implementations herein;

FIG. 13 is a flow chart of a method of emitting light from an illuminator in accordance with at least one of the implementations herein;

FIG. 14 is a detailed flow chart of a method of emitting light from an illuminator in accordance with at least one of the implementations herein;

DETAILED DESCRIPTION

Figure 1:
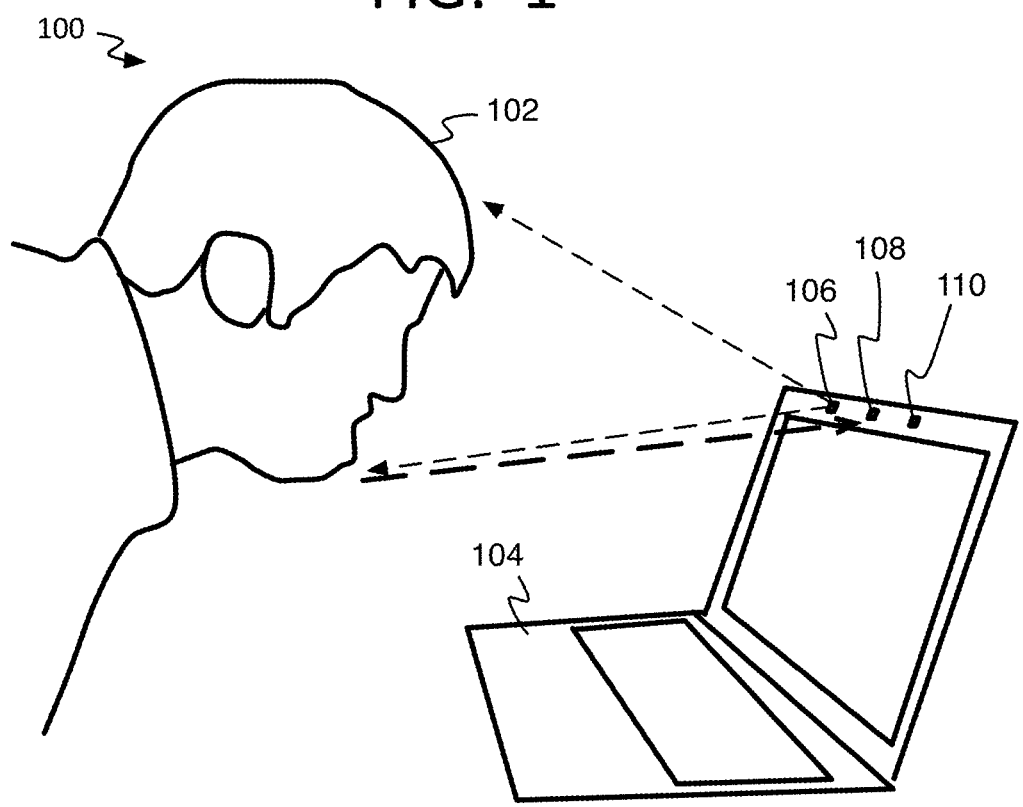
FIG. 1 is an illustration of a user using an electronic device with a light projection and image capturing system being used for object detection and access authorization.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein, other than the specific structure of an illuminator and camera sensor described herein, are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smartphones, cameras, laptop computers, tablets, and so forth, as well as dedicated access authorization devices either for access to an electronic device or otherwise mounted or placed at a variety of physical locations may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein.

The material disclosed herein, other than the specific structure of the IR illuminator and sensor described below, may be implemented in hardware, firmware, software, or any combination thereof. The material disclosed herein also may be implemented as instructions stored on a machine-readable medium, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

A system and method of reducing speckle for an illuminator.

As mentioned, an infra-red (IR) illuminator may be used for biometric detection or other applications. For example, such biometric detection may be related to face or iris illuminators and IR imaging systems including face login and other near infrared (NIR) centric techniques, usages, devices, and the like. Such techniques, usages, devices, and the like may require controlled NIR illumination to generate an image with the specific characteristics needed for face recognition or other usages.

Referring to FIG. 1, an example face login system 100 is shown where a user 102 faces an access authorization device 104, which in this example may be a computer or laptop with an IR illuminator (or projector) 106, and a camera or sensor 108 that detects light projected from the IR illuminator and reflected from an object 102 to be detected such as the user's face. Such an arrangement conventionally is performed by using an LED illuminator emitting NIR light.

Figure 2:
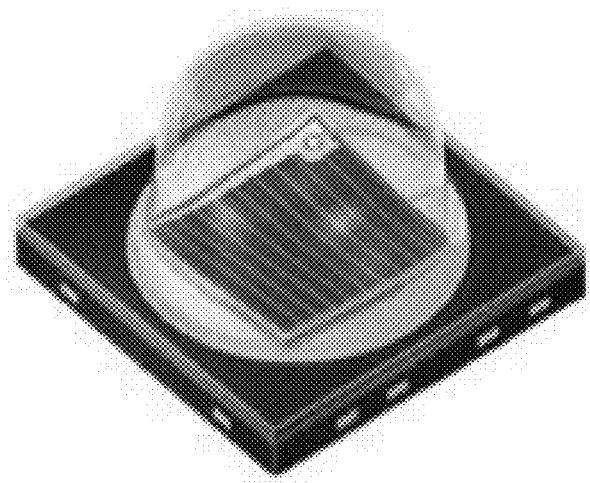
FIG. 2 is perspective close-up view of a conventional LED used for light projection.

Referring to FIG. 2, an example LED die 200 may emit light in a Lambertian pattern in such an illuminator. Due to the large change in index of refraction between the semiconductor material (e.g., close to 4) and air (e.g., 1) most of the energy is reflected back into the substrate leading to low extraction efficiency. A lens may be provided over the LED die to narrow the beam and/or to make a side-emission pattern. For example, the lens for a surface mounted LED may be pre-formed molded plastic (e.g. silicone), which is bonded to a package in which the LED die is mounted. Bonding the lens to the semiconductor may couple the light energy into the lens which uses the curved surface to both improve extraction efficiency and to control the beam angle. A face login device may use an LED with a refractive element to focus the light onto the target, such as the example illuminator 200.

Figure 3:
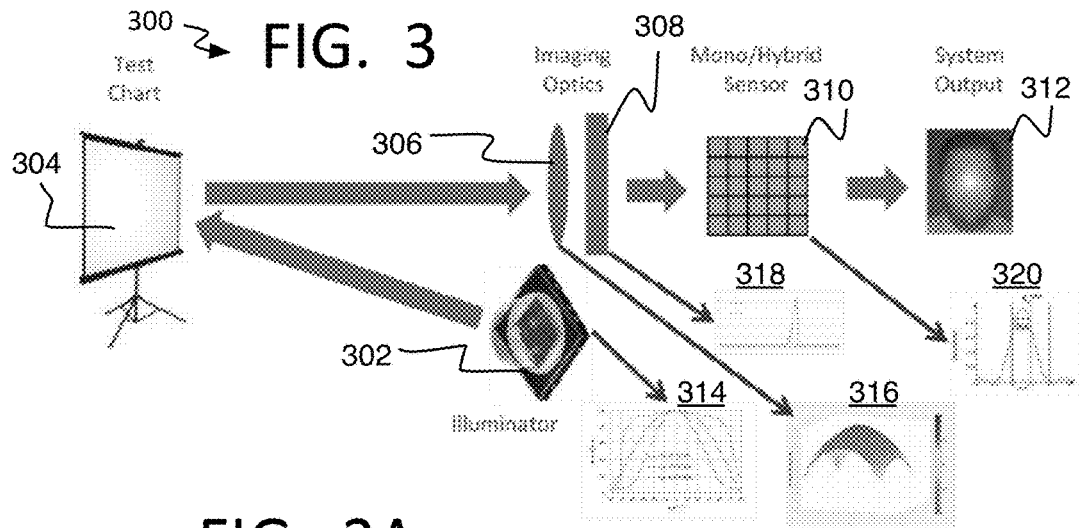
FIG. 3 is a schematic diagram of a conventional LED IR light projection and image capture and processing system.
Figure 3A:
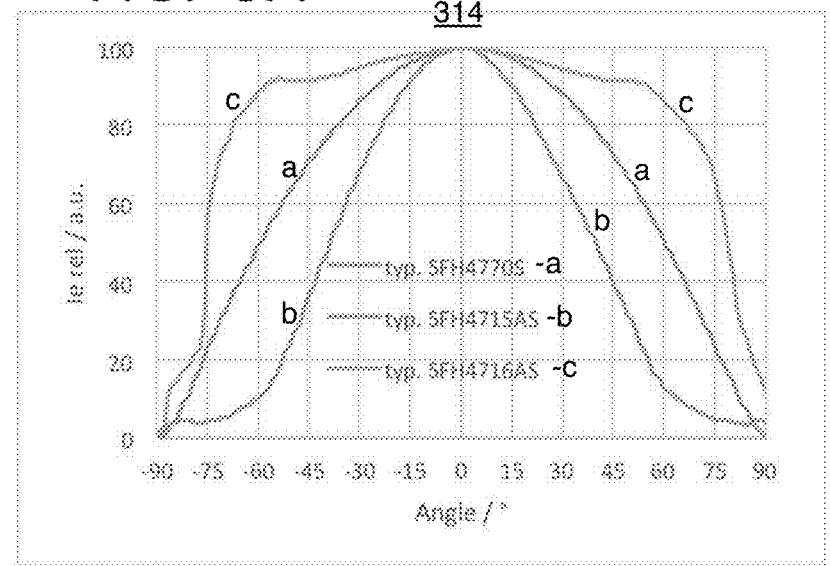
FIG. 3A is a far-field radiation emission distribution graph for conventional LEDs used in the system of FIG. 3.
Figure 3B:
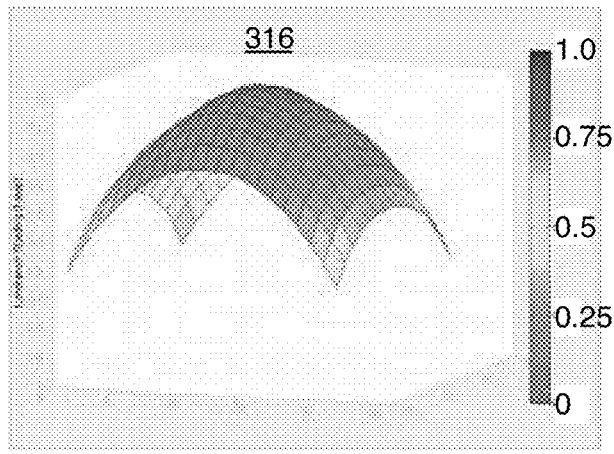
FIG. 3B is a lens luminance intensity level graph for the system of FIG. 3.
Figure 3C:
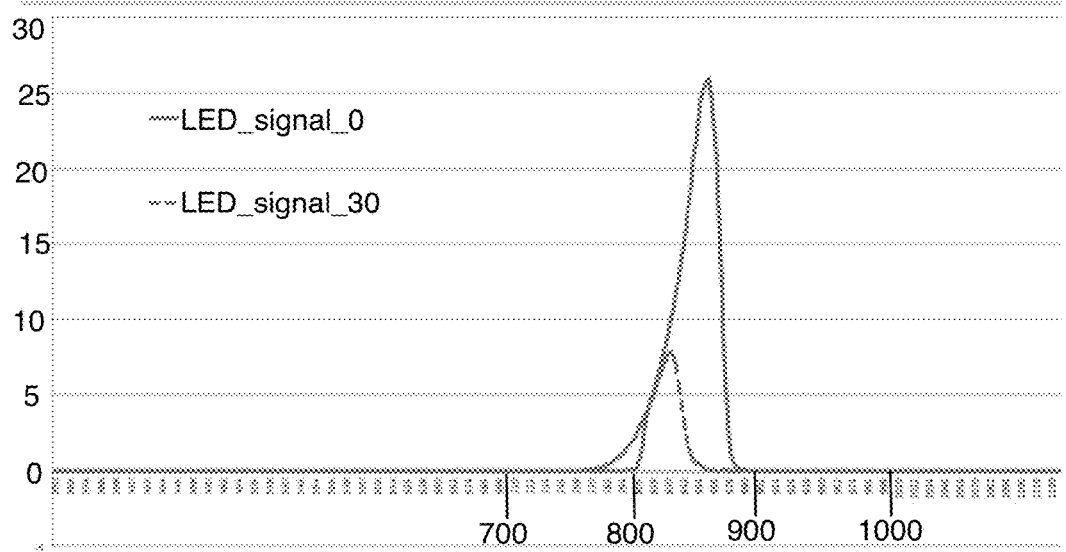
FIG. 3C is a graph showing the captured energy as a function of wavelength for the system of FIG. 3.
Figure 3D:
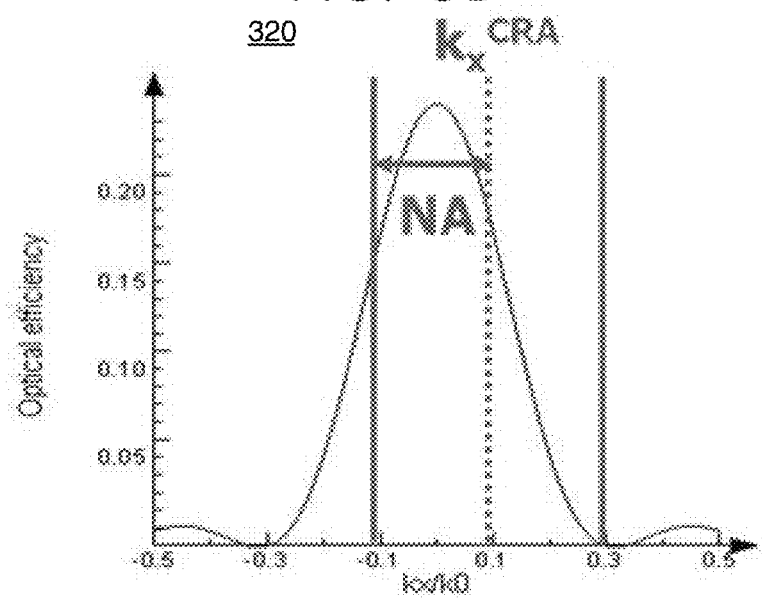
FIG. 3D is a graph showing the numerical aperture for the image sensor in the system of FIG. 3.

Referring to FIG. 3, an example conventional LED IR projection system 300 has an LED illuminator 302 that is emitting light onto an object 304, which may be a face for detection, but a test screen is shown here to exemplify experiments to improve the conventional system. The LED may be emitting light in a far-field radiation pattern shown on graph 314 (FIG. 3A). A camera may receive the reflected light and may have imaging optics that receive the light emitted from the LED illuminator 302 and reflected from the object 304, and may include a lens 306 and an optical filter 308. The lens 306 may provide a light reception pattern as shown on luminance intensity level graph 316 (FIG. 3B), while the optical filter 308 may limit the spectral response of the camera as exemplified by the wavelength graph 318 (FIG. 3C). A sensor 310, which may be for monochromatic light such as IR or may be for a combined RGB-IR light sensing, may receive the light, as limited by the sensors numerical aperture as represented by an optical efficiency graph 320 (FIG. 3D) and produce raw image data as illustrated on image 312.

Also as mentioned above, and as shown on LED IR radiation distribution graph 314, the conventional LED IR illuminators for many different applications including object detection and face detection, provide IR images with low SNR at the edges and corners of the image. This may be due to fall off (radiation reduction) of the illuminator, lens shading, image sensor aperture, angular effects of the IR band pass filter (the band pass filter being too narrow for the emission spectrum of the LED and incoming light incidence angle to the BPF), or the like. This fall off can be seen by the various results at the edges and corners of the graphs FIGS. 3A-3B.

In such examples, the target distance and screen characteristics may be set by the application requirements, and the system may be configured to offer a minimum SNR across the field of view of the camera. However, each of the elements (or LEDs) may have a tendency to be less efficient at increased angles such that the non-uniform characteristics may aggregate. For example, it may be possible to compensate for the fall off only in the illuminator such as by using diffractive elements as discussed below, which may increase the size and cost of the illuminator.

Referring to FIG. 4 for more detail, as one specific example, such an approach that uses an LED covered by a lens limits the ability to control the emission pattern in order to provide uniform light intensity in combination with high extraction efficiency (e.g., here referring to minimizing the emission light outside of the image input angle needed to form an entire image). For example, the optics may be designed to narrow the emission angle to increase efficiency, but the radiation intensity will fall off proportional to the sine of the emission angle increasing as the emission angle increases. Far-field radiation pattern graph 400 shows the conventional radiation curve 402 (on one side of the camera viewing angle from 0 to about 60 degrees). This is similar to radiation distribution graph 314 (FIG. 3A). At 0 degrees, the relative intensity is at 1.0 which is too high and may cause washout as mentioned above. At the edge of a camera viewing angle (or referred to herein as the outer image emission angle, which may be less than the total emission angle) and that would form the edges of a resulting image, here about 20-25 degrees but would depend on the configuration of the LED package, the intensity has already fallen too low (fallen 20%) so that the intensity from 0 to the outer edge of the viewing emission angle at 20-25 degrees is not very uniform. Also, the fall-off at greater emission angles than the outer image emission angle is relatively mild (non-steep) so that there is still 20% intensity at 60 degrees and does not reach 0 intensity until 100 degrees at the outer limit of the total emission angle, which is significant wasted energy and power that could be used elsewhere on the camera (or imaging device), or could permit such a device to have a longer battery life.

Such losses conventionally are compensated for by using digital gains (e.g., lens shading correction), but the loss of signal corresponding to a loss of signal to noise ratio (SNR) in the corners and edges of an image causes some systems to fail to meet performance needs of various applications that analyze the SNR of the entire image to perform certain tasks. The low SNR has been found to result from the lack of light intensity from the LED at the outer or edge image emission angle (herein this example at about 20-25 degrees).

Therefore, a better balance is needed between uniformity (e.g., obtained by providing a wide emission angle so sufficient light intensity reaches the whole image) and efficiency (by narrowing the emission angle). Specifically, a desired radiation distribution curve 404 is shown on graph 400. In order to reduce the center washout effect, the illuminator center (at 0 degrees) should have lower intensity (here lowered by about 20%). It has been found that the intensity at the outer image emission angle at part 408 of curve 404 (20-25 degree region for example) should not just remain flat, but should be increased by about 20% greater than the normal emissions to form peaks in order to compensate for the undesired effects mentioned above and provide adequate SNR and intensity at the edges and corners of an image. Greater than the outer emission image angle (part 410 of curve 404), it is desirable to make the radiation distribution curve fall-off as sharp (or steep) as possible to reduce wasted energy and power. Here, it was found to be desirable to drop to 0 intensity by about 60 degrees.

Another parameter that was found to affect the quality of the resulting image is ambient light. Ambient light may degrade performance when too much of the ambient light is able to reach the sensor. The acceptance of ambient light may be reduced through the use of an optical band pass filter; however, to accommodate the emission characteristics for the light emitting diode (LED) illuminator and the angle of incidence characteristics of the filter, the passband of the bandpass filter often must be more than 100 nm wide or more, which may allow too much ambient light into the camera, which affects the light intensity pixel values of the resulting image. Such problems may apply particularly to face and iris scanning as mentioned above, eye tracking, and any NIR camera that relies on active illumination and is expected to work in ambient light conditions.

To resolve these issues and achieve the desired radiation distribution pattern (or emission pattern), a vertical-cavity surface emitting laser (VCSEL) illumination source may be used instead of the LED, and which may offer a smaller and more controlled source of illumination with greater collimation as well as narrower emission wavelengths. A vertical-cavity surface-emitting laser (VCSEL) is a semiconductor laser diode with a laser beam emission perpendicular from a top surface, in contrast to conventional edge-emitting semiconductor lasers or in-plane lasers, which may emit from surfaces formed by cleaving the individual chip out of a wafer. The VCSEL may provide a reduced emission angle that provides light intensity much closer to the outer ends of the proposed radiation distribution curve as shown on graph 400 so that the output distribution pattern better matches the camera viewing angle to reduce waste at the outer limits of the angle that is outside the outer (or edge) image emission angle.

Figure 5:
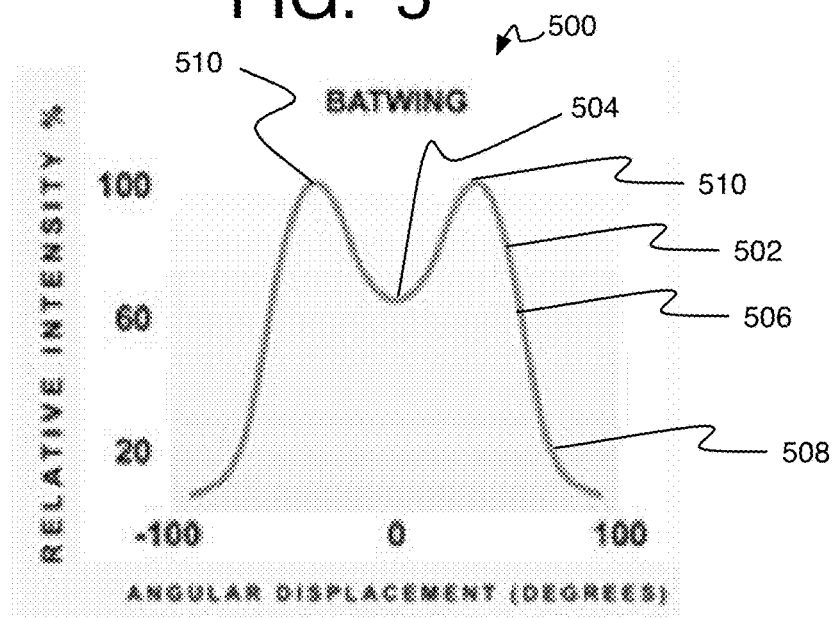
FIG. 5 is a far-field radiation emission distribution graph showing a batwing pattern in accordance with at least one of the implementations herein.

Referring to FIG. 5 specifically, the illumination pattern of the VCSEL may be controlled or tuned for an application resulting in the outer wings 508 of the batwing pattern 502. The desired distribution pattern 502 on radiation distribution graph 500 may have a fall-off portion 506 and flaring end portion 508 until light intensity is zero. This fall off portion is outside of the outer image emission angle (herein 20-25 degrees in this example) but still within the total emission angle which may be out to about 100 degrees in this example. The VCSEL may have better emission control with a narrower total light emission than a comparable LED and cause these sections 506 to fall steeper and reach 0 light intensity at a smaller total emission angle than the LED. The VCSEL provides a fall-off at the outer wings of the radiation distribution pattern, outside of the outer edge incident angle (or image emission angle), reaches 0 light intensity at about 60 degrees by one example approach, and by another form, at about 45 degrees or less, and by one form, at 45 degrees. This results in the reduction of wasted energy and a much more efficient illuminator.

Also with the use of the VCSEL at the illuminator, a bandpass filter at the camera sensor can reduce the amount of ambient light affecting the camera sensors. The increased spectral purity of the light provided by the VCSEL permits the passband to be about five times narrower than the passband with the LED solution, resulting in an increase of about five times in the ambient light that the system can manage (or reducing the amount of ambient light permitted to reach the sensor by 80%). By one example, the passband is merely about 10-12 nm for example compared to a 60 nm passband for the LED, significantly reducing the amount of ambient light wavelengths that can pass through the filter. By other forms, it has been found that when an LED-based system has a passband of about 100 nm wide, the VCSEL-based system may use a BPF that has a passband of about 20 nm wide, and by another form about 20 nm wide or less, such as 10-12 nm wide.

In addition to ambient light rejection, the use of the VCSEL may permit the bandpass filter to improve color quality as some NIR energy will leak into the RGB channels for the RGB-IR cameras. The energy in the NIR band is sometimes known to corrupt the colors. With the use of the VCSEL providing a reduced range of wavelengths, the wavelengths affected by the leakage and the gain are both reduced.

The use of the VCSEL, however, does not provide the desired intensity peaks 510 (also peaks 408 on desired distribution 404 (FIG. 4)) at the outer image emission angle on the radiation distribution pattern that would provide a more uniform light intensity. By the example used herein, and as mentioned above, the outer image emission angle is at the 20-25 degree region on radiation distribution graphs 400 and 500.

By one approach, a metalayer may be used to shape the radiation distribution pattern and provide the more uniform light intensity. The metalayer (also interchangeably referred to herein as a metamaterial, metasurface, meta-lens, metamaterial lens layer, metamaterial layer, beam shaper, or any combination of these) is structured to make SNR more uniform, and in a relatively small package such as less than 1.5 mm in the Z (height)-dimension by one example.

The metalayer may be placed on the emitting surface of the light source, or VCSEL, to generate the desired light intensity peaks at the outer image emission angles. This is performed while reducing the light intensity at the center (or optical axis) of the illuminator, and in turn, the resulting images. This is achieved by establishing the far-field batwing (or M-shaped) light intensity or radiation distribution pattern 502, and the metalayer may be arranged or refined to form a desired illumination pattern for a specific application. The batwing pattern 502 may be defined by having two roughly equal peaks 510 with a valley 504 between the peaks 510 at about 0 degrees in emission angle. By one form, the batwing shape is characterized by a U-shaped valley 504 or a valley with a pointed bottom, where, by one example, there is no substantially flat, horizontal, constant light intensity radiation within the valley. By one form, the bottom of the valley 504, near 0 degrees in emission angle by one example, reaches about 80% light intensity, or about 20% less light intensity than the peaks 510. By another example, the valley reaches about 30-40% less intensity than the peaks, and by one form, about 35% less light intensity than the peaks.

Figure 5A:
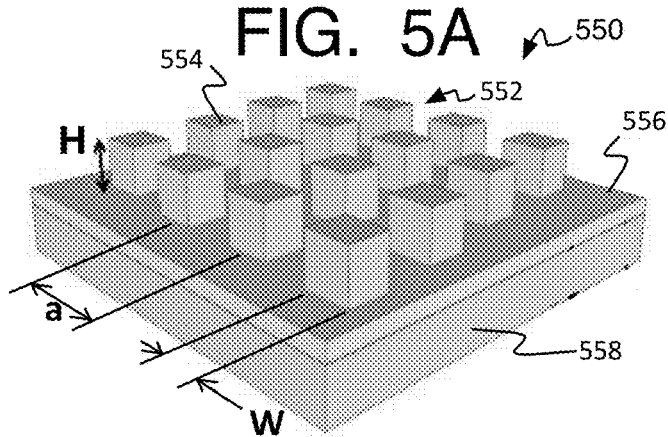
FIG. 5A is an upper perspective view of an example metalayer in accordance with at least one of the implementations herein.

Referring to FIG. 5A by one form, an example metalayer 550 may have a base portion 556, and a plurality 552 of spaced light scattering posts 554 extending from the base portion. The base portion is disposed adjacent the VCSEL 558 to receive the light emitted from the VCSEL. The posts (also referred to by many names including optical antennas, meta-atoms, nanostructures, nanoparticles, nanoscatterers, subwavelength scatterers, and resonators) receive light from the light emitting surface and steer the output light to form the desired radiation pattern. Post here simply refers to the post extending away from a substrate surface to form a distinct structure from the substrate and does not necessarily mean the height of the post is greater than a width or diameter of the post, nor that the post must extend vertically relative to the earth.

The posts 554 are sized, shaped, and spaced in both direction and distance to impart a phase on the wavefront as a function of position on the VCSEL surface, thus producing the desired far-field radiation pattern. By one form, the posts may be rectangular as shown but may be curvalinear, cylindrical, elliptical, and so forth, in top view, and may be spaced 'a' part from each other, where 'a' is some factor of a wavelength. By one example, the spacing may be in a hexagonal lattice with a lattice constant of approximately $\lambda/2$ (where $\lambda$ is the wavelength). The width or diameter w of the posts may be about four to ten times smaller than the wavelength of the light received from the light source, and the height H of the posts may be at most two times smaller than the wavelength of the light. The metalayer may be formed by known methods and may be formed of $TiO_x$ with $1<x<2$, and by another form where $x \leq 2$ or at least where $x<2$. The metalayers produce abrupt and controllable changes of optical properties by engineering the interaction between light and the array of posts. Therefore, metalayers may introduce a spatially varying electromagnetic or optical response (e.g., scattering amplitude, phase, and/or polarization). In other words, by tailoring the properties of each element of the post array, the phase of the scattered light may be spatially controlled and consequently "mold" the wavefront.

Thus, the light source and metalayer are arranged to cooperatively form a far-field batwing radiation pattern of light emission comprising a lower light intensity valley part between two peaks of light intensity parts along the batwing radiation pattern. By one form, the peaks have the greatest amount of light intensity on the entire batwing pattern. This results in greater SNR at the edges and corners of the image, and more uniform SNR over the whole image. Many other details of a metalayer that performs the functions described above are disclosed by U.S. patent application Ser. No. 15/793,795, filed Oct. 25, 2017, titled A META ILLUMINATOR, and that is fully incorporated herein. It should also be noted that the metalayer posts can be arranged to handle multiple wavelengths due to the desired varying electrical current driven by the systems described below.

The VCSEL, however, also forms undesirable, severe, high-contrast speckle due to the high coherence of laser light, and such speckle may degrade image quality. Specifically, laser (VCSEL) light is inherently narrow band; however, when a light source (such as the VCSEL) emits coherent light such that it emits light at substantially a single wavelength at a single phase for example. When this light reflects off a rough surface such as an object to be detected, multiple paths of various lengths are generated between the illuminator and detector, and the light from various paths may interfere with each other in the detector, combining in constructive or destructive manners. This combining works to form patches of higher intensity light and lower intensity light respectively due to the resulting constructive interference where light waves combine, and deconstructive interference where light waves subtract from each other. In an image detector with a finite aperture such as on camera sensors, and which are much like the human eye, these varied patches of intensity appear as optical "speckles," as some small portions spots, or blotches of the image look brighter than other small portions. Further, this spot-to-spot intensity difference can vary depending on an observer's (or sensor's) position, which makes the speckles appear to change when the observer or sensor moves.

Figure 6:
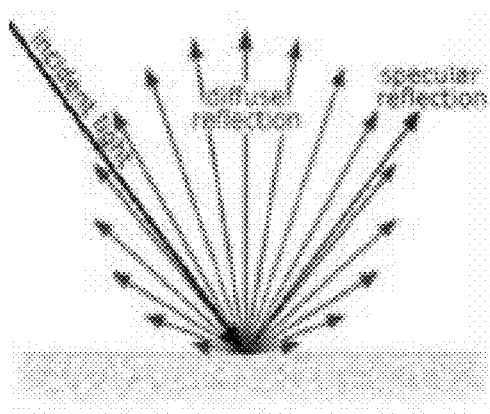
FIG. 6 is a schematic diagram to explain diffused and specular light reflection.
Figure 7A:
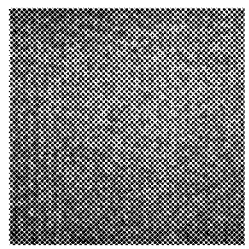
FIG. 7A is a resulting IR image from an IR camera system showing significant performance degradation from speckle.
Figure 7B:
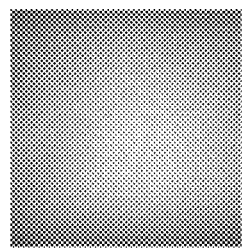
FIG. 7B is a resulting IR image from an IR camera system showing example reduced speckle degradation of the image from FIG. 6A.
Figure 8A:
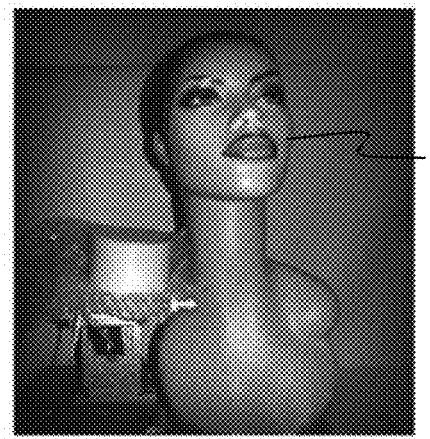
FIG. 8A is a resulting IR image from an IR camera system showing significant performance degradation from speckle.
Figure 8B:
FIG. 8B is a resulting IR image from an IR camera system showing example reduced speckle degradation of the image from FIG. 7A.
Figure 9:
FIG. 9 is a resulting IR image from an IR camera system showing significant performance degradation due to speckle on an image of a face.

Referring to FIG. 6, a light reflection diagram 600 shows the difference between diffused and specular light that forms speckles. The speckle can be computed as the coherence of the diffuse light, and the speckle may be determined by:

$$I_D = L \cdot NCI_L, \quad (1)$$

$$L \cdot N = |N||L|\cos \alpha = \cos \alpha \quad (2)$$

where $I_D$ is the intensity of diffusely reflected light, L is the light direction vector from a surface to the light source, N is the surface's normal vector, and N and L are normalized, C is color, $I_L$ is the intensity of incoming light, and a is the angle between the two vectors. Thus, the speckle is formed when some wavefronts add and others subtract causing small uneven light and dark spots or blotches on the sensor which vary based on the distance to the object.

Referring to FIGS. 7A-9, one example of severe high-contrast speckle is provided on an image 700 of a speckled flat surface and corrected to a much more uniform surface in image 750 using the speckle reduction techniques disclosed herein where the difference between the two is very clear. Another example of severe high-contrast speckle is provided on speckled image 800 and corrected in image 850 where both images show the same mannequin 802. The areas with reduced speckle can be seen where the image has a flatter, more uniform color and brightness without (or reduced) dots, blotches, and so forth. Image 900 (a face) provide another example with severe non-uniformities introduced by speckle that may render the image unsuitable for various applications. By one example, the speckles may interfere with object detection analysis of objects in the images.

Figure 10A:
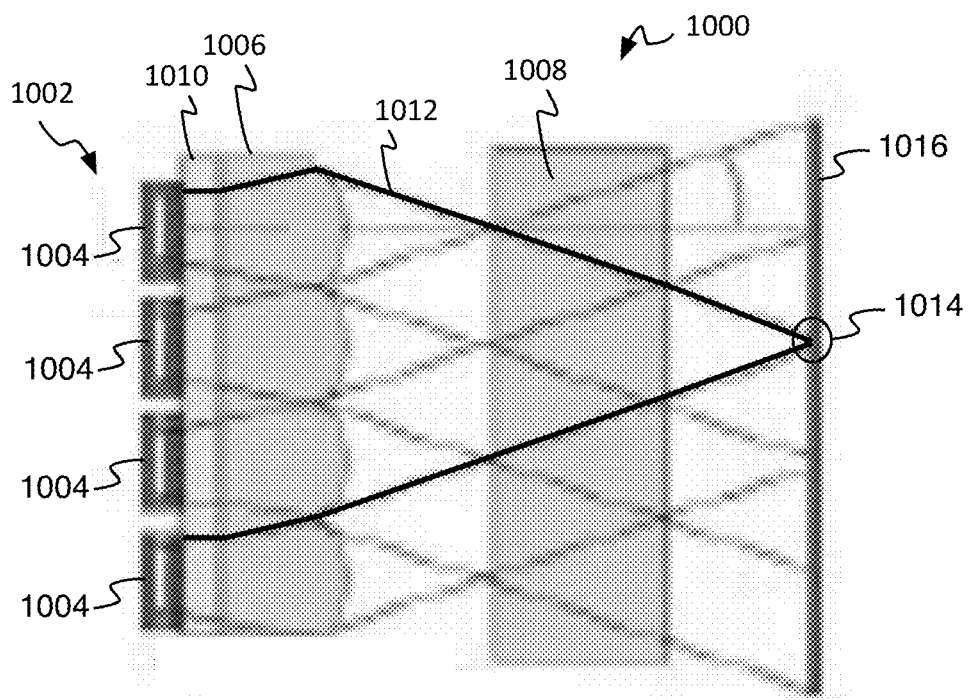
FIG. 10A is a schematic diagram of an illuminator with multiple VCSELs demonstrating the generation of speckle.

Referring to FIG. 10A, an example illuminator 1000 is provided to show speckle creation when the light source is an array 1002 of VCSELs 1004 that emit at a single, uniform wavelength that forms cohesive light. The array 1002 may be a 1D (single row) or 2D array. Such an array of VCSELs may be used to raise the light intensity. Lenses 1006 may be placed over the VCSELs 1004 and a diffuser 1008 may be spaced from the lenses 1006. The lenses may be directly mounted to the VCSELs 1004 or may be attached via directing optics 1010. In operation, the lenses may organize the light rays 1012 into cohesive light so that the light rays 1012 from the array 1002 of VCSELs 1004 may interfere with each other even without first reflecting from a rough surface, and as shown in constructive interference at a spot 1014 on a surface (or sensor) 1016. In this case, the diffuser 1008 is spaced too close to the lenses for example, where the diffuser 1008 does not help to reduce the cohesion of the light and may even increase the cohesion of the light, and in turn, increase the contrast of the speckle.

Figure 10B:
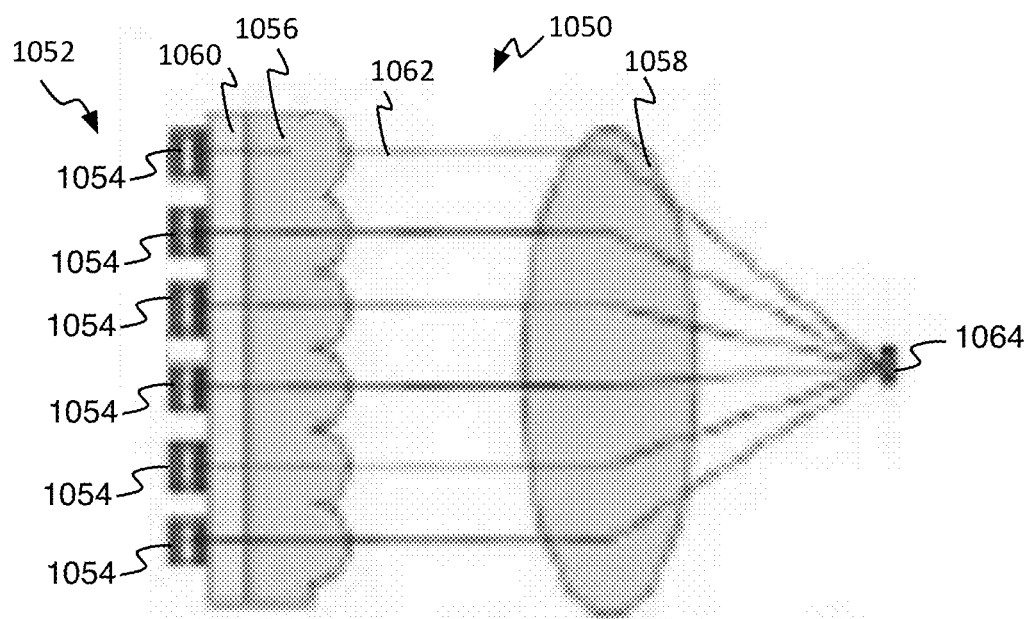
FIG. 10B is another schematic diagram of an illuminator with multiple VCSELs demonstrating the generation of speckle.

Referring to FIG. 10B likewise, an example illuminator 1050 has a 1D or 2D array 1052 of VCSELs 1054 with lenses 1056 that may be placed over the VCSELs 1054 and an outer lens 1058 spaced from the lenses 1056. As with lenses 1004, the lenses 1056 may be directly mounted to the VCSELs 1054 or may be attached via directing optics 1060. Here, the lenses 1056 may act as a collimator and arrange the light rays 1062 from the VCSELs 1054 to emit in parallel. In this case, it is demonstrated that the outer lens 1058 may act as a de-collimating lens to direct a number of the light rays 1062, received in parallel, toward a single spot 1064 on a surface or sensor causing high-contrast speckle.

On these conventional VCSEL arrays, each VCSEL in the array tends to have very close to the same wavelength, less than 1 nm difference. This is due to the close proximity of the emitter elements within the array and the uniform wafer characteristics of the usually epitaxially grown laser structure. Therefore, the individual VCSELs in a conventional 2D VCSEL array form speckle patterns that are nearly identical. These patterns combine to form high contrast speckle where the difference between the dark and light speckle spots can be similar a single VCSEL. High contrast speckle results in high levels of noise in the image that can wash out the actual image data (or signal) such that the speckle limits the ability of an imaging system to resolve fine spatial detail on an image. When mere low contrast speckle is present, either the speckle is sufficiently small so that image data (or signal) around the speckle is sufficient to reconstruct the image data (or is so small reconstruction of the image data is not needed), or the image data (or signal) can be discerned through the relatively dispersed, low-contrast speckle itself.

Figure 11:
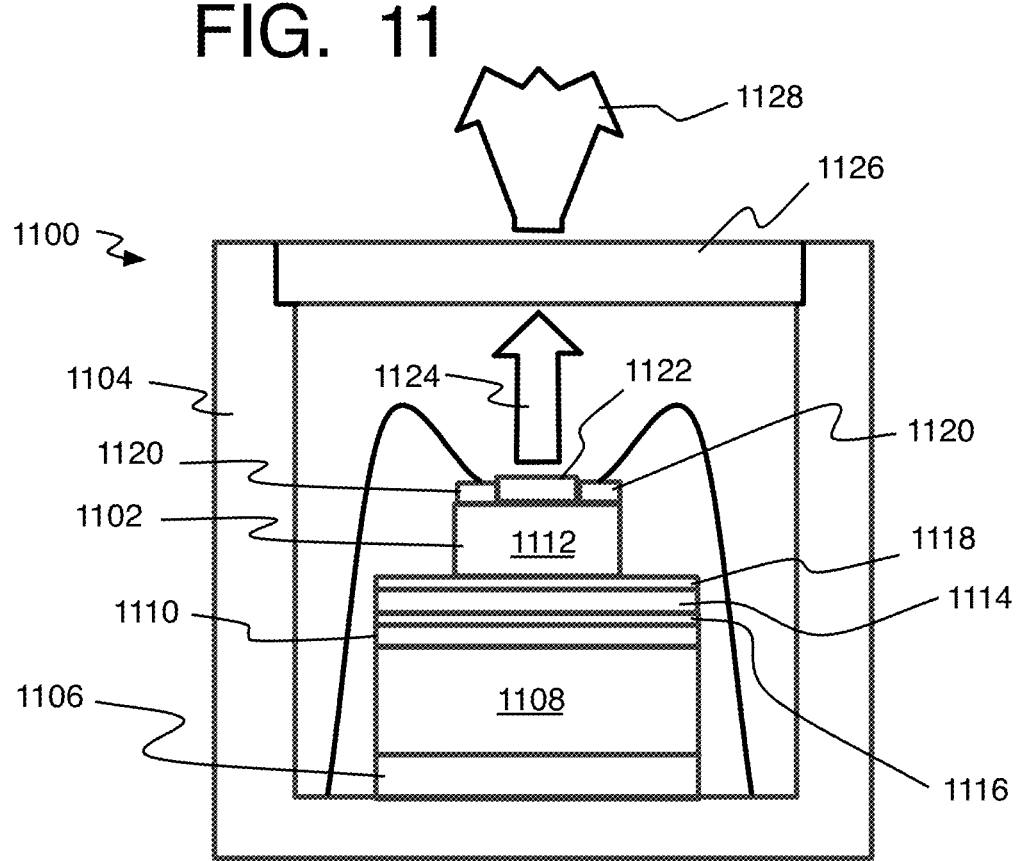
FIG. 11 is a cross-sectional side view of a vertical cavity semiconductor emitting laser (VCSEL) with a diffuser.

Referring to FIG. 11, one attempt to reduce speckles (and increase overall uniformity) is accomplished by spacing an optical diffuser further away from the VCSEL as shown on lighting device (or lighting package) 1100 so that it splits each incoming light ray into a plurality of rays of differing vectors. These rays proceed to the target via different paths, with each generating a unique speckle pattern in the detector. The plurality of speckle patterns are summed in the detector which can have the effect of reducing the magnitude of the speckle. Lighting device package 1100 shows a VCSEL 1102 in a body or casing 1104. The VCSEL 1102 here is bonded with epoxy 1106 to the body or casing 1104 and is built on a substrate 1108, including distributed Bragg reflector (DBR) (or mirror) layers 1110 and 1112, an active region 1114 of quantum well and barrier layers between two confinement layers 1116 and 1118. A metal contact 1120 surrounds a plastic silicone lens 1122 that emits light 1124. A diffuser 1126 spaced at a correct distance above the DBR layer 1112 of the VCSEL 1102 may adequately diffuse and emit the light in a less coherent pattern 1128. This may be applied to a light source that has an array of VCSELs rather than a single VCSEL. This configuration of device package 1100, however, introduces a performance/size tradeoff forcing the package to be taller to hold the diffuser 1126, which may be undesirable in many small form factors and may increase cost.

Another way to reduce speckle is to emit light in multiple wavelengths. Specifically, when a surface, such as the object receiving light projected from the illuminator, is illuminated by a light wave, according to diffraction theory, each point on the illuminated surface acts as a source of secondary spherical waves and forms a scattered light field of reflected light traveling toward the camera sensor. The light at any point in the scattered light field is made up of waves which have been scattered from each point on the illuminated surface. If the surface is sufficiently rough to create pathlength differences exceeding one wavelength, giving rise to phase changes greater than $2\pi$, the amplitude, and hence the intensity, of the resultant light varies randomly. If light of low coherence (i.e., made up of many wavelengths) is used, a speckle pattern will not normally be observed because the speckle patterns produced by individual wavelengths have different dimensions and in this case, the average of the wavelengths is the dominant wavelength that is established and is impacted at the sensor. Thus, speckle contrast reduction is essentially the creation of many independent speckle patterns, so that the patterns average out on the retina, or in this case, the detector's sensor. This can be achieved by wavelength diversity where emitted light from an illuminator provides multiple different wavelengths that differ by a small amount.

In more detail, speckle reduction is based on averaging S independent speckle configurations within the spatial and temporal resolution of the detector, and where each configuration has a different wavelength. It has been found that, under the most favorable conditions, where all the S independent speckle configurations have equal mean intensities, the contrast is reduced by a factor of $\sqrt{S}$. For example, if a light source emits multiple different dominant wavelengths, then speckle will be reduced. The wavelength separation depends on the surface on which imaging is taken (e.g. facial skin).

A speckle pattern depends on the wavelength of the illuminating light. The speckle patterns from two beams with different wavelengths become uncorrelated if the average relative phase-shift created by the surface is $\geq 2\pi$. Thus, the wavelength difference should be:

$$\delta\lambda \geq \lambda^2/2z \qquad (8)$$

where z is the surface profile height variation of the illuminated surface. For example if wavelength if $\lambda=0.85$ µm and height variation z=0.1 mm, the wavelength difference should be $\geq 3.6$ nm.

By one solution, light with multi-wavelengths may be emitted among elements of a VCSEL array. When an array of VCSELs has individual or each VCSEL emitting at a sufficiently different wavelength, each wavelength in the array generates an independent speckle which are averaged in the detector thereby reducing the contrast of the speckle. This can be applied to multiple VCSEL arrays as well where each VCSEL array has a dominant average wavelength that is different form the dominant wavelength of the other arrays. By one form, the wavelength difference between individual or each VCSEL in an array is at least about 1 nm, or the difference between dominant or average wavelengths of multiple VCSEL arrays is at least about 1 nm. Such a solution is described in detail in U.S. patent application Ser. No. 15/793,795, filed Oct. 25, 2017, titled A META ILLUMINATOR, and that is fully incorporated herein.

By another solution and that is described in detail below, an electrical circuit that powers the illuminator may be controlled and arranged to operate the VCSEL to emit light with multiple wavelengths thereby reducing the cohesion of the light, and in turn reducing the contrast of the speckle. This may be performed by using different current levels to shift the output wavelength. For example, a current driving solution may be provided to shift an output wavelength based on a varying applied current. In other implementations, the driving power of the VCSEL may be adjusted to vary the frequencies of the applied electrical current to form multiple different average output wavelengths that reduce the speckle contrast. Other implementations may combine the two techniques. Such techniques may improve VCSEL efficiency in terms of illumination and uniformity. The details are explained below.

Referring to FIG. 12, a light package or illuminator device 1200 may have the electrical current driven through the illuminator in a way that reduces the speckle either by varying the current level or the power as described below. The illuminator 1200 has a similar VCSEL structure as device 1100, and the layers are numbered similarly, except here body 1204 may be flat or shorter since no diffuser is provided above the VCSEL to hold the diffuser as with casing 1104 so that here the package 1200 can be shorter. Also, a metalayer 1222 may replace the plastic lens 1122 of package 1100 to redirect and emit the light received from the VCSEL 1202 as mentioned above. When an array of VCSELs are provided on an illuminator, each VCSEL may have its own metalayer 1222 as shown on the single VCSEL on illuminator 1200. As mentioned, the VCSEL provides a fall-off at the outer wings of the radiation distribution pattern that reduces wasted energy, while the metalayer shapes the radiation distribution pattern to form a desirable batwing shape as described above. Either illuminator device 1100 (still with the diffuser) or 1200 (without the diffuser) may use the current driving methods described herein.

Referring to FIG. 13, an example process 1300 for emitting light from an illuminator as described herein is arranged in accordance with at least some implementations of the present disclosure. In the illustrated implementation, process 1300 may include one or more operations, functions or actions as illustrated by one or more of operations 1302 to 1304 numbered evenly. By way of non-limiting example, process 1300 will be described herein with reference to any of the example devices or systems described herein and where relevant.

Process 1300 may include "emit light from an illuminator having a light source with at least one vertical-cavity surface emitting laser (VCSEL)" 1302. By another approach the light source is a monochromatic light source, and in one form, is an infra-red (IR) or near-infra-red (NIR) illuminator that comprises at least one vertical-cavity surface emitting laser (VCSEL). The light emitting surface may be on the DBR layer 1212 by one example. As described above, this better controls the emission than an LED to reduce power consumption due to a narrower wavelength emission that also enables reduction of the harmful effects of ambient light at the band pass filter of the sensor (or camera) by enabling reduction of the width of the passband of the filter. The light source may be a single VCSEL, a single array of VCSELs, or multiple VCSEL arrays. The light source may have a metasurface disposed on each or individual VCSELs to direct the wavefront of the light to a desired radiation pattern, such as the batwing pattern, to provide a more uniform system performance and SNR on an image formed at a camera or sensor by using the light from the illuminator.

Process 1300 also may include "drive current through the illuminator to generate light with at least two dominant output light wavelengths being sufficiently maintained and sufficiently different to each other to reduce speckle on an image to be formed by using the light from the at least one VCSEL" 1304, and particularly, the device may have circuitry and contacts to apply an electrical current across the VCSEL to induce the light from the VCSEL into a desired generally vertical direction of propagation into and through the metalayer, if present, and with at least two different wavelengths. For example, the different driving current may cause an output wavelength shift. Such a wavelength shift may cause the optical path to shift thereby reducing the interference among the light with different wavelengths, which reduces light cohesion, and in turn, reduces the contrast of resulting speckle on an image formed by using the light from the illuminator. The wavelengths are referred to as being sufficiently maintained to refer to an intentionally maintained wavelength rather than a substantially instantaneous wavelength that may be created when changing the current or power driving the current from one current level to another current level (or turning the power on and off for example). It also may refer to generating the at least two output dominant wavelengths each at constant time periods to form a desired average output wavelength. This may refer to a continuous time period or a total time period including breaks between pulses for example and as described below. As to being sufficiently different wavelengths, one approach has the wavelengths to differ by at least about 1 nm to significantly reduce speckle contrast.

The system or illuminator may drive the current in a number of different ways to generate light with at least two different wavelengths. By one form, this is accomplished by applying at least two different current levels, and by one form, with a difference of at least about 0.5 amps, and by one example, about 0.5-0.7 A to form one of the at least two wavelengths and between about 1.1-1.3 A to form another of the at least two wavelengths, and by another example, 0.6 A on one level and 1.2 A on another level. By another approach, driving the current also includes driving power to the illuminator on and off in pulses to form a pulse width modulation, and the current is then changed depending on the pulse so that different pulses have different maximum current levels. This may include different pulse patterns where the different maximum current levels, and in turn wavelengths, alternate from adjacent pulse to adjacent pulse, or one of the maximum current levels has a different number of consecutive pulses in a group next to one or more pulses of another current level.

By yet another approach, the frequency of a group of pulses may be modified to be different than the frequency of another group of pulses so that each group forms light with a different wavelength. This variation in wavelength is caused by controlling the power to drive the current in pulses, rather than changing the current level, which also reduces light cohesion from the illuminator thereby reducing speckle. Further, the two techniques may be combined to both vary the current level and the frequency of the pulses to further decrease the cohesion of the light and reduce speckle. By one example, a group of pulses with one current level is applied between single pulses of a different current level, and where the frequency of a group of the pulses after different single pulses also may be varied to provide a different average wavelength from group to group. The details are explained with light emitting process 1400 below.

Referring to FIG. 14, an example process 1400 for emitting light to capture images described herein is arranged in accordance with at least some implementations of the present disclosure. In the illustrated implementation, process 1400 may include one or more operations, functions or actions as illustrated by one or more of operations 1402 to 1412 numbered evenly. By way of non-limiting example, process 1400 will be described herein with reference to any of the example light emitting or image processing systems or devices described herein and where relevant.

Process 1400 may include "emit light from an illuminator comprising a light source having at least one vertical-cavity surface emitting laser (VCSEL)" 1402. As mentioned, the light source of the illuminator may be one or more VCSELs, and may be one or more arrays of VCSELs, where the use of the VCSEL narrows the emission and reduces the effect of ambient light at the camera sensor. An array of VCSELs may or may not be used to have individual VCSELs emit light in different wavelengths to reduce at least some of the speckle contrast.

This operation also may include "emit light through a metasurface to direct a wavefront radiation into a predetermined pattern", and particularly into the batwing radiation pattern described above and to better provide a uniform light intensity and SNR over an image formed by using the light. Such a metalayer may be provided at each or individual VCSELs that are present on the illuminator.

Figure 15:
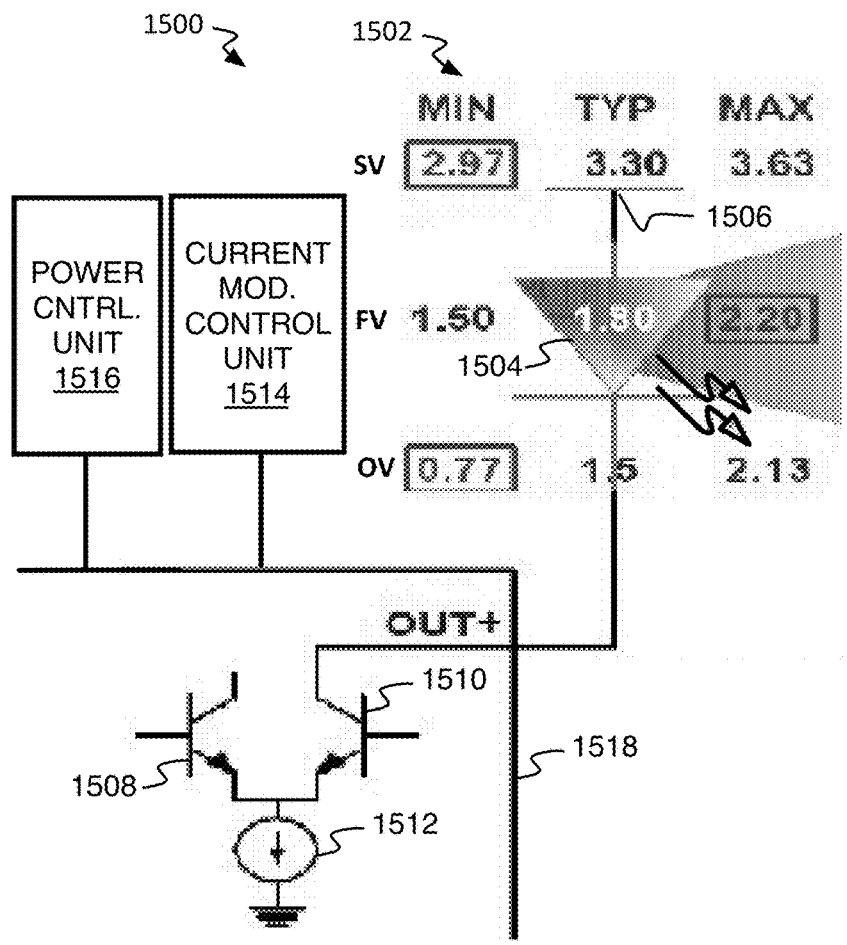
FIG. 15 is a schematic diagram and electrical diagram of an illuminator in accordance with at least one of the implementations herein.

Referring to FIG. 15, process 1400 may include "drive current through the illuminator to generate light" 1404. An illuminator 1500 may have an electrical circuit 1502 that may be a driving integrated circuit (IC) to operate a VCSEL light source 1504 on the illuminator. The circuit 1502 may include a voltage source 1506, such as a battery, DC power source, or other known DC sources. The current may be controlled by an SFP laser driver 1518 with a NPN bipolar junction transistor at the current source 1512. The static bias voltage is shown when using a VCSEL. Under worse-case conditions (minimum supply (2.97V) and maximum forward voltage (2.20V)) of a typical VCSEL, the voltage at the output would be only 0.77V (supply−forward voltage). This leaves 0.07V for modulation current to pass through the VCSEL and any parasitic inductance in the signal path. Thus, $V_{OUT}$ should be greater than 0.7V in this example. The power may or may not be provided with a pulse width modulation.

A current driving unit may be provided, and may be, or include, a current modulation control unit 1514 and/or a power control unit 1516 that may be provided to operate the circuit respectively to vary the current levels and vary the frequency of the pulses when such PWM pulses are used. These units may be software that can be updated, firmware, or hardware. These units may be positioned in or on the illuminator, and particularly, on board with the circuit components, or may be at a remote location on the same device as the illuminator such as with multi-purpose devices (smartphone, tablet or computer for example), or otherwise wired or wirelessly communicating with the illuminator to control the circuit.

The current modulation control unit 1514 may initiate a change to a different current level. This may include also informing the circuit which current levels to adjust to, or the circuit may be pre-set with the current levels to be used. Specifically, the varying of the current level is performed by adjusting parameters in current source 1512 such that the desired current is sourced. This control may be accomplished by multiplexing between various circuits to provide pre-set currents, or by controlling a flexible current source using digital registers and digital to analog converters to apply the register settings to control the current source.

The power control unit 1516 may provide pulse width modulation when used, and controls the turning on and off of the power at frequencies set to a clock for example, and the power control unit 1516 may inform the circuit when to turn on and off. Specifically, the generation of the pulse width modulation at various frequencies of the pulses is performed by digital logic that generated the appropriate waveforms to turn on and off the current sync transistor 1510. The waveforms may be generated using digital state machines, code running on a microcontroller or microprocessor, by analog timing circuits and many other ways available.

On the illuminator, the circuit 1502 has contacts on the DBR layer as well as the opposite side of the substrate on the VCSEL to induce electrical current through the VCSEL, and particularly through the active regions of the VCSEL. This forms an electro-magnetic field in the illuminator to generate light propagation in the vertical direction of the illuminator relative to the layers of the VCSEL where the light may have multiple wavelengths by varying the current and/or the frequency of pulses supplying power to the VCSEL. This may be performed in a number of different ways.

Figure 20:
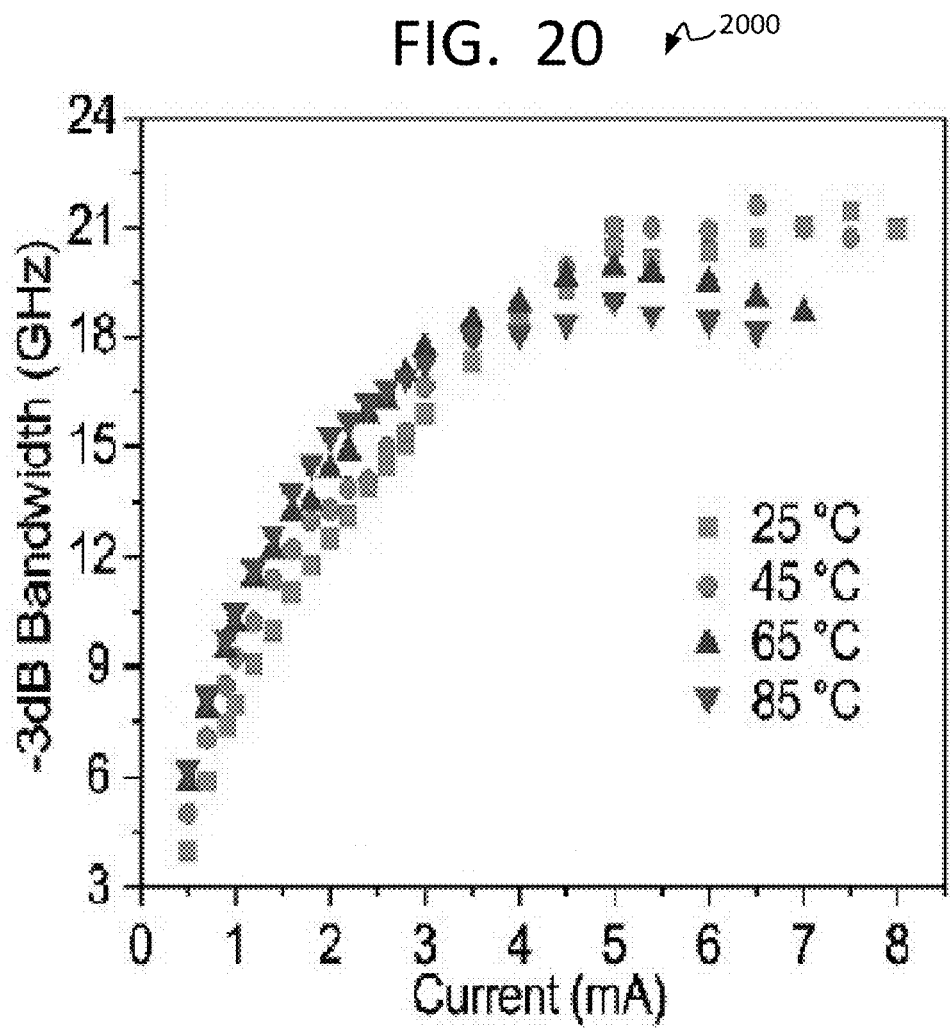
FIG. 20 is a graph showing current versus light frequency in accordance with at least one of the implementations herein.

Referring to FIG. 20, one way to generate multiple wavelengths in the light is to vary the current levels. Thus, process 1400 may include "vary the current to form at least two light wavelengths that are sufficiently different from each other to reduce speckle" 1406. A graph 2000 shows wavelength versus current, and where the wavelength is provided in frequency of −3 dB bandwidth (GHz) and current is provided in mA, and where wavelength (nm) =speed of light/frequency. The relationship between the current and the wavelength depends on the type of light source and particular design of the light source. This characteristic is best determined through measurement of a statistically valid sample of devices across the required operating temperature.

The current levels may be determined by a combination of optimizing for the cost of the drive circuit (higher peak current requires more expensive components), the amount of speckle the system can accept, and the individual speckle and current characteristics of the device being controlled. For example, an illuminator with multiple VCSELs may deliver acceptable performance with two current values differing by 0.5-0.7 A while another system may require a current difference of 1.1-1.3 A. The amount of required illumination as well as the available power budget also may play into this optimization.

Figure 15A:
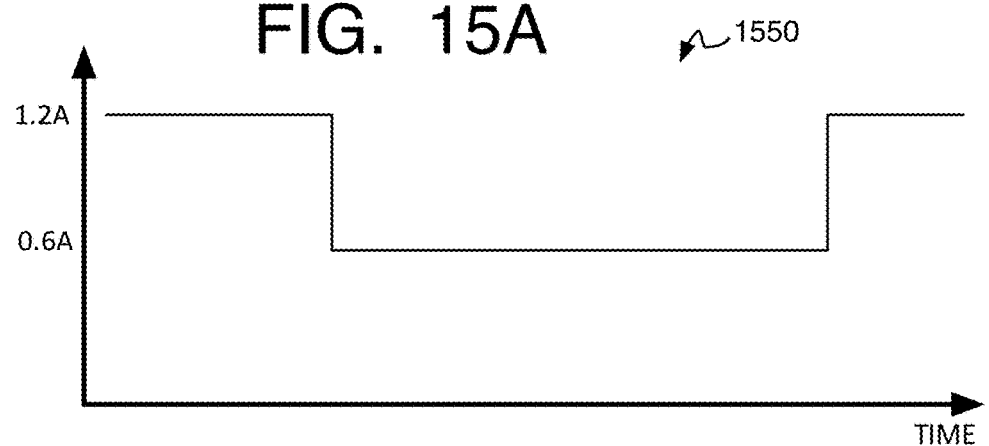
FIG. 15A is a current graph showing current flow in accordance with at least one of the implementations herein.

Referring to FIG. 15A, a current graph 1550 shows variation of the current between a current level at 0.6 A and another current level at 1.2 A. By another form, the amount of amperage may be varied between about 0.5-0.7 A to form one of the at least two wavelengths and between about 1.1-1.3 A to form another of the at least two wavelengths. In this example, the current levels are at least about 0.5 A or 0.6 A different here in order to form wavelengths that are at least 1 nm apart. By one form, these two current levels are found to form wavelengths that are 855 nm and 856 nm.

In this example, the current is applied at one level and then the other level continuously without pulsing the power on and off. By this example, the current levels may be alternately maintained so that the light is emitted at the two wavelengths for about the same time, and one wavelength does not significantly dominate over the other wavelength. Thus, the two current levels should be alternated about equally over time, and about equally split within a time period of about the exposure period of the detecting camera, so that speckle is reduced a significant amount. If more than two levels of current are provided, by one example, then each current level should have an equal amount of time compared to the other current levels.

Figure 16:
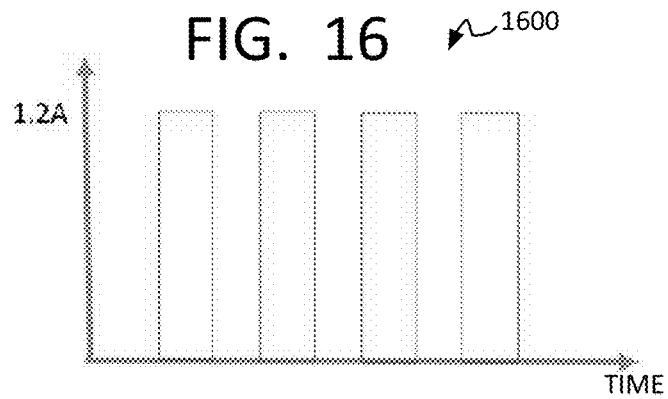
FIG. 16 is a current graph showing pulsed current flow.

Referring now to FIG. 16, and with VCSEL drivers, the power may modulated using pulse-width modulation (PWM) to reduce power consumed and heat generated by the VCSEL while the power is off between the pulses. A current graph 1600 shows one PWM pattern with a driving current output that may be a 50% duty PWM signal. In an implementation, the driving current may be 1.2 A at 50% duty cycle where each pulse is a uniform width and at the same current level. Such a PWM pattern alone may still emit a single dominant wavelength causing cohesive light that results in undesirable, severe, high-contrast speckle.

Figure 17:
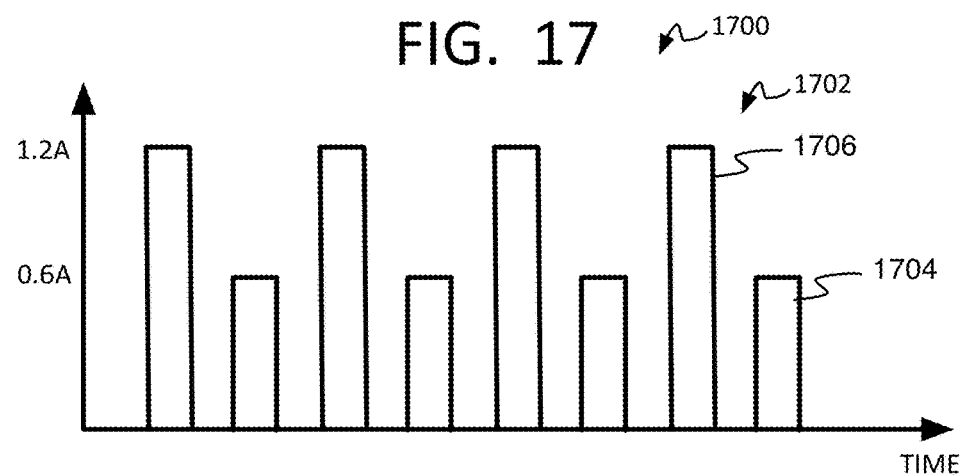
FIG. 17 is a current graph showing alternative current flow in accordance with at least one of the implementations herein.

Referring to FIG. 17, such a PWM system, however, can be modified to reduce the speckle contrast. Thus, process 1400 may include "drive the current in pulses with different current levels" 1408. For example, a current graph 1700 shows a pulse pattern 1702 showing that the driving current comprises driving power to turn power to the illuminator on and off in pulses, and changing the current level so that different pulses have different maximum current levels. By one example, at least two different current levels are formed: an upper maximum level on the taller (larger amplitude) pulses 1706 and a lower maximum level on the shorter (smaller amplitude) pulses 1704 and that form the peaks of the pulses, here shown with example flat or uniform current levels at each pulse.

By one approach, the driving current sets the current levels to alternate between raising the current to the upper maximum level of current for a predetermined amount of time providing one or more pulses and to raising the current to a lower maximum level of current for a predetermined amount of time providing one or more pulses. Thus, the pulses may alternate current levels every other pulse as shown on pattern 1700, or it may alternate by some other number of pulses, such as 2, 3, 4, etc. consecutive pulses at the same current level and alternated with another group of pulses with the same or a different number of pulses.

Figure 17A:
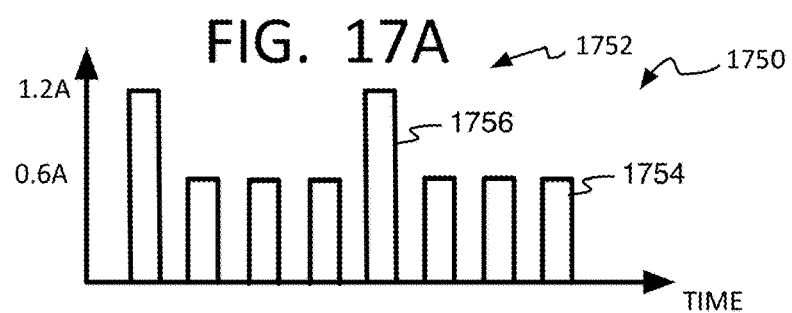
FIG. 17A is a current graph showing alternative current flow in accordance with at least one of the implementations herein.

Referring to FIG. 17A for example, a current graph 1700 shows a pulse pattern 1752 where driving the current includes raising the current to the upper maximum level at intervals and for a single pulse 1756, and provides a uniform time period having more than one pulse 1754 of the lower maximum level of current between consecutive single pulses 1756. Here a group of three lower current level pulses 1754 are positioned between the single upper current level pulses 1756. This still may be maintained at a desired uniform PWM frequency such as 50% duty so that the pulses all have a uniform width, where at 50% PWM is the same as the uniform gap between the pulses.

In any of the alternating pulse examples with the 50% duty PWM, the pulses may be provided at a frequency such that a minimum of one of the repeating patterns will be captured by the detector during the exposure period to obtain at least two sufficiently different wavelengths. If, for example, the detector is capturing the image with an integration time of 17 msec, then the pattern should complete at least once during this time span, and preferably a large number of times during this time span (>10) in order to eliminate any beat frequency issues between the modulation of the illuminator and the exposure of the sensor. Many other alternatives are contemplated.

Figure 18:
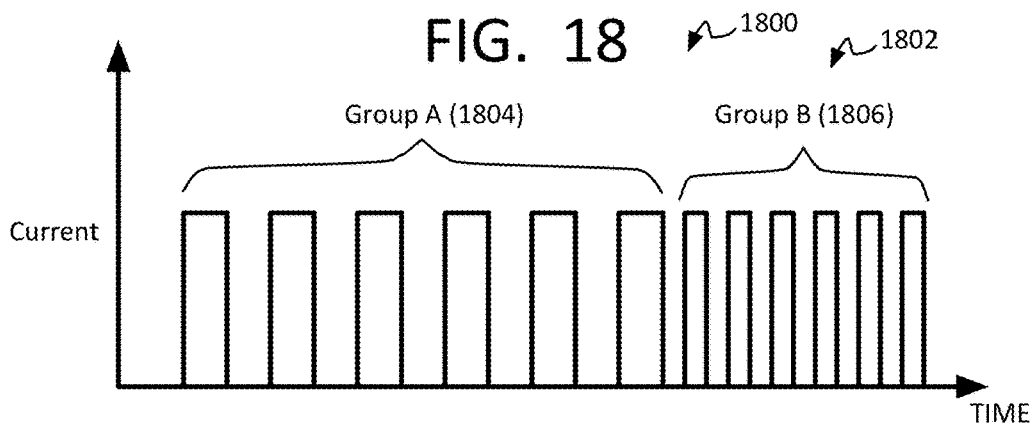
FIG. 18 is a current graph showing another current flow in accordance with at least one of the implementations herein.

Referring to FIG. 18, by other approaches, varying frequency of the pulses in groups of consecutive pulses also may generate multiple different average wavelengths that reduces cohesion of the light and in turn speckle contrast. Thus, process 1400 may include "drive the current in pulses at different frequencies" 1410. This may include providing power to turn the power to the illuminator on and off in pulses, and providing power to one group of consecutive pulses at a frequency different than the frequency of at least one other group of consecutive pulses to respectively form average wavelengths that are sufficiently different from each other to reduce light cohesion as explained above. A current graph 1800 shows an example pulse pattern 1802 with a group A of pulses 1804 with a larger frequency than the frequency of a group B of pulses 1806 with a lower frequency. Each group of pulses may extend the same time period but then have a different number of pulses, or may have different time periods but the same number of pulses, or both could be varied from group to group. Each group may generate a different average wavelength due to the different frequencies of the pulses. In this example, the current level may be held at a single uniform level for all or multiple different groups. By one form, the difference in average wavelength from group to group should be at least about 1 nm. By one example, the difference in frequencies should be 50 hz where one frequency may be about 45 hz and the other frequency may be about 55 hz. The frequencies may be computed by average output power energy as well.

Figure 19:
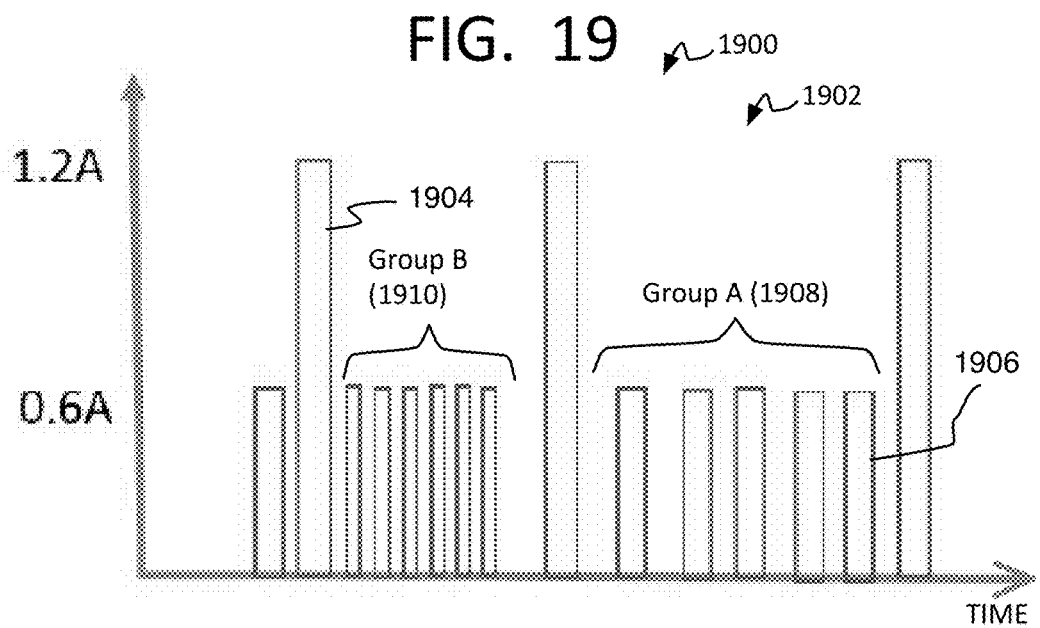
FIG. 19 is a current graph showing another current flow in accordance with at least one of the implementations herein.

Referring to FIG. 19, by another example, both variation in current level and variation in frequency of pulses may be combined to generate a desired difference in light wavelengths. Thus, process 1400 may include "drive the current by both varying the current level and varying the frequency of pulses to form at least two wavelengths sufficiently different to reduce speckle" 1412. This may include driving current to vary the amount of amperage so that the one group has a different maximum current level compared to the maximum current level of at least one other group to increase the difference in two wavelengths in addition to the difference in the wavelengths already provided by the change in frequency of the groups. In one example, a current graph 1900 shows a pulse pattern 1902 with taller pulses 1904 at different current levels (different amplitudes) than shorter pulses 1906 forming groups A and B, and here at a higher current level of 1.2 A for the single larger amplitude pulses 1904, and a lower current level of 0.6 A for the groups A and B of pulses. The PWM also may be adjusted to different frequencies as well, so that the group A of pulses 1908 has a frequency of 45 hz forming an average wavelength of 1312 nm, and a group B of pulses 1910 that has a frequency of 55 hz forming an average wavelength of 1308 nm providing a difference in wavelength of about 1308-1230 range. This provides a total shift in the output wavelength of the VCSEL due to both the variation in the current level and the frequency. Specifically, this may be considered to include two shifts, one shift in output wavelength for the difference in current level, and then another shift in output wavelength for the difference in frequency. These shifts may be added to each other to generate a total change in wavelength that should be at least 1 nm, and this amount depends on the physical response by the VSCEL emitter and an average energy output of the VCSEL. When applying a higher driving power and higher frequency, the VCSEL emitter will generate more photons with a greater wavelength.

It should be noted that the VCSEL still may be used for speckle contrast reduction as well as better emission control and ambient light interference reduction with or without adding a metalayer described above. When the metalayer is used, the posts of the metalayer may be dimensioned and shaped to receive light at the multiple wavelengths formed by varying the current level and/or power as described above. This may involve arranging the posts of the metalayer for some combination wavelength such as an average of the varying wavelengths, or some median wavelength, or individual posts of the same single metalayer could be dimensioned for different wavelengths, such as alternating the post dimensions for different wavelengths or by some other pattern. The alternating may be across rows, row by row, or polar-based alternating along radii for example. By one form, the metalayer is capable of handling a range of wavelengths within about 20 nm of each other.

In addition, any one or more of the operations represented by the processes, devices, or explanations in FIGS. 13-15 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic and/or firmware logic configured to provide the functionality described herein. The software may be embodied as a software package, code and/or instruction set, and/or firmware that stores instructions executed by programmable circuitry. The modules may, collectively or individually, be embodied for implementation as part of a larger system, for example, an integrated circuit (IC), system on-chip (SoC), and so forth.

As used in any implementation described herein except where specifically described above, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the systems discussed herein. Further, one of ordinary skill in the art will appreciate that operations performed by hardware and/or firmware may also utilize a portion of software to implement the functionality of the logic unit.

As used in any implementation described herein, the term "engine" and/or "component" may refer to a module or to a logic unit, as these terms are described above. Accordingly, the term "engine" and/or "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 21:
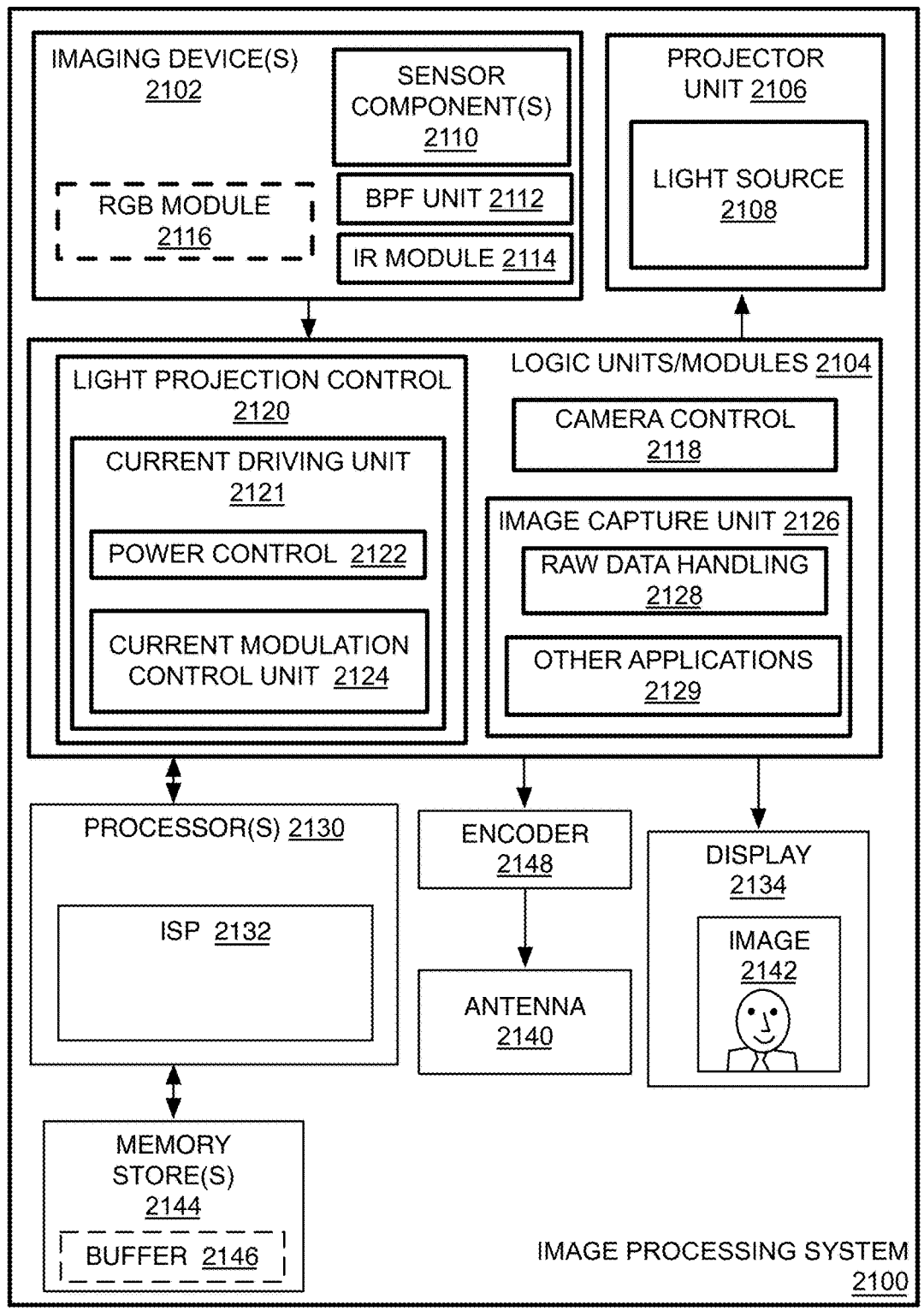
FIG. 21 is an illustrative diagram of an example illuminator and image processing system in accordance with at least one of the implementations herein.

Referring to FIG. 21, an example image processing system 2100 is arranged in accordance with at least some implementations of the present disclosure. In various implementations, the example image processing system 2100 may have an imaging device 2102 to form or receive captured image data, and a projector unit 2106 to emit light to be reflected from objects and captured by the imaging device 2102. This can be implemented in various ways. Thus, in one form, the image processing system 2100 may be a digital camera or other image capture device (such as a dedicated camera), and imaging device 2102, in this case, may be the camera hardware and camera sensor software, module, or component 2110, while the projector unit 2106 is the projector hardware including a light source 2108 which may be one or more VCSELs, such as one or more VCSEL arrays, and with or without a metalayer on each or individual VCSELs, and may have projector software, modules or components as well. In other examples, image processing device 2100 may be a multi-purpose electronic device, such as on a smartphone or laptop for example, and may have an imaging device 2102, that includes or may be a camera, and the projector unit 2106. In either case, logic modules 2104 may communicate remotely with, or otherwise may be communicatively coupled to, the imaging device 2102 and projector unit 2106 for further processing of the image data.

Also in either case, such technology may include a camera such as a digital camera system, a dedicated camera device, or an imaging phone, whether a still picture or video camera or some combination of both. This may include a light projection and camera system such as a face detection, iris detection, or detection of other parts on a person to authorize an action or access for that person. Such a system may be provided on a multi-purpose computing device for access to that device, files on that device, or access to other objects, or could be part of a dedicated access authorization system such as a door or safe lock. Other forms for the image processing device 2100 may include a camera sensor-type imaging device or the like (for example, a webcam or webcam sensor or other complementary metal-oxide-semiconductor-type image sensor (CMOS)), with or without the use of a (RGB) depth camera and/or microphone-array to locate who is speaking. The camera sensor may also support other types of electronic shutters, such as global shutter in addition to, or instead of, rolling shutter, and many other shutter types. In other examples, an RGB-Depth camera may be used in addition to or in the alternative to a camera sensor. This may include an RGB-IR stereo camera.

In one form, imaging device 2102 may include camera hardware and optics including one or more sensors as well as auto-focus, zoom, aperture, ND-filter, auto-exposure, flash (if not provided by projector unit 2106), and actuator controls. These controls may be part of the sensor module or component 2110 for operating the sensor. The sensor component 2110 may be part of the imaging device 2102, or may be part of the logical modules 2104 or both. Such sensor component can be used to generate images for a viewfinder and take still pictures or video. The sensor component 2110 may be arranged to sense IR light, RGB light, or both. A bandpass filter (BPF) unit 2112 may provide filters for IR light, RGB light (such as with a Bayer color filter), or both as well. The imaging device 2102 also may have a lens, an analog amplifier, an A/D converter, an IR module 2114, optionally an RGB module 2116, and other components to convert incident light into a digital signal, the like, and/or combinations thereof, and provide statistical signals and data desired for analysis of an IR image for example (which may or may not include a computed SNR or the signals for another application to compute the SNR). The digital signal also may be referred to as the raw image data herein.

The projector unit 2106 may have those components necessary to operate the VCSEL light source and metalayer, when present, to emit IR or another type of light. Thus, the projector unit 2106 may include circuitry to control the power fed to the light source 2108 as well as one or more clock circuits to indicate when to turn the light source on and off to perform PWM for example. Thus, the projector unit 2106 may include the circuit 1502 or may include parts of the circuit 1502 (FIG. 15). The projection module 2106 also may include other light sources, such as for the camera flash, or to provide additional types of light than IR.

In the illustrated example, the logic modules 2104 may include a camera control unit 2118 that manages the various general operations of the imaging device 2102 such as turning the camera on and off, setting adjustable parameters on the camera for capturing images, and transmitting data from the imaging device, and a light projection control 2120 to operate the projector unit 2106. The light projection control 2120 may include a current driving unit 2121 to operate the power and modify the current level driving the light source 2108. This may include a power control 2122 that receives any adjustable settings from the camera control 2118 and operates the circuit 1502 to provide power to the light source 2108, and by PWM when desired and as described above. The current driving unit 2121 also may have a current modulation control unit 2124 to operate the circuit to vary the current levels driving the light source 2108 as described above. The logic modules also may include an image capture unit 2126 that has a raw data handling unit 2128 that performs pre-processing on received image data, and then other image processing applications 2130 that process the image data for various purposes such as object detection including face or iris detection, eye tracking, image warping or augmentation, depth detection operations, and so forth. The applications 2130 also may include applications that compute and/or use the SNRs to analyze IR images, and if the SNR is not already computed or signal provided by the IR module 2114 for example. Otherwise, the IR module may provide the SNR for analysis of an image.

It will be understood that units herein may be considered a part of the same unit or component due to the functions of those units and are not necessarily physically located together or considered the same part of coding that operates that component.

The image processing system 2100 may have one or more of processors 2130 which may include a dedicated image signal processor (ISP) 2132 such as the Intel Atom, memory stores 2144 with RAM, cache, and/or other memory types, one or more displays 2134, encoder 2148, and antenna 2140. In one example implementation, the image processing system 2100 may have the display 2134, at least one processor 2130 communicatively coupled to the display, at least one memory 2144 communicatively coupled to the processor, and having a buffer 2146 by one example for storing image data and other data related to projector unit 2106 and/or imaging device 2102. The encoder 2148 and antenna 2140 may be provided to compress the modified image date for transmission to other devices that may display or store the image. It will be understood that the image processing system 2100 may also include a decoder (or encoder 2148 may include a decoder) to receive and decode image data for processing by the system 2100. Otherwise, the processed image 2142 may be displayed on display 2134 or stored in memory 2144. As illustrated, any of these components may be capable of communication with one another and/or communication with portions of logic modules 2104, projector unit 2106, and/or imaging device 2102. Thus, processors 2130 may be communicatively coupled to the imaging device 2102, projector unit 2106, and the logic modules 2104 for operating those components. By one approach, although image processing system 2100, as shown in FIG. 21, may include one particular set of blocks or actions associated with particular components, units, or modules, these blocks or actions may be associated with different components, units, or modules than the particular component, unit, or module illustrated here.

Figure 22:
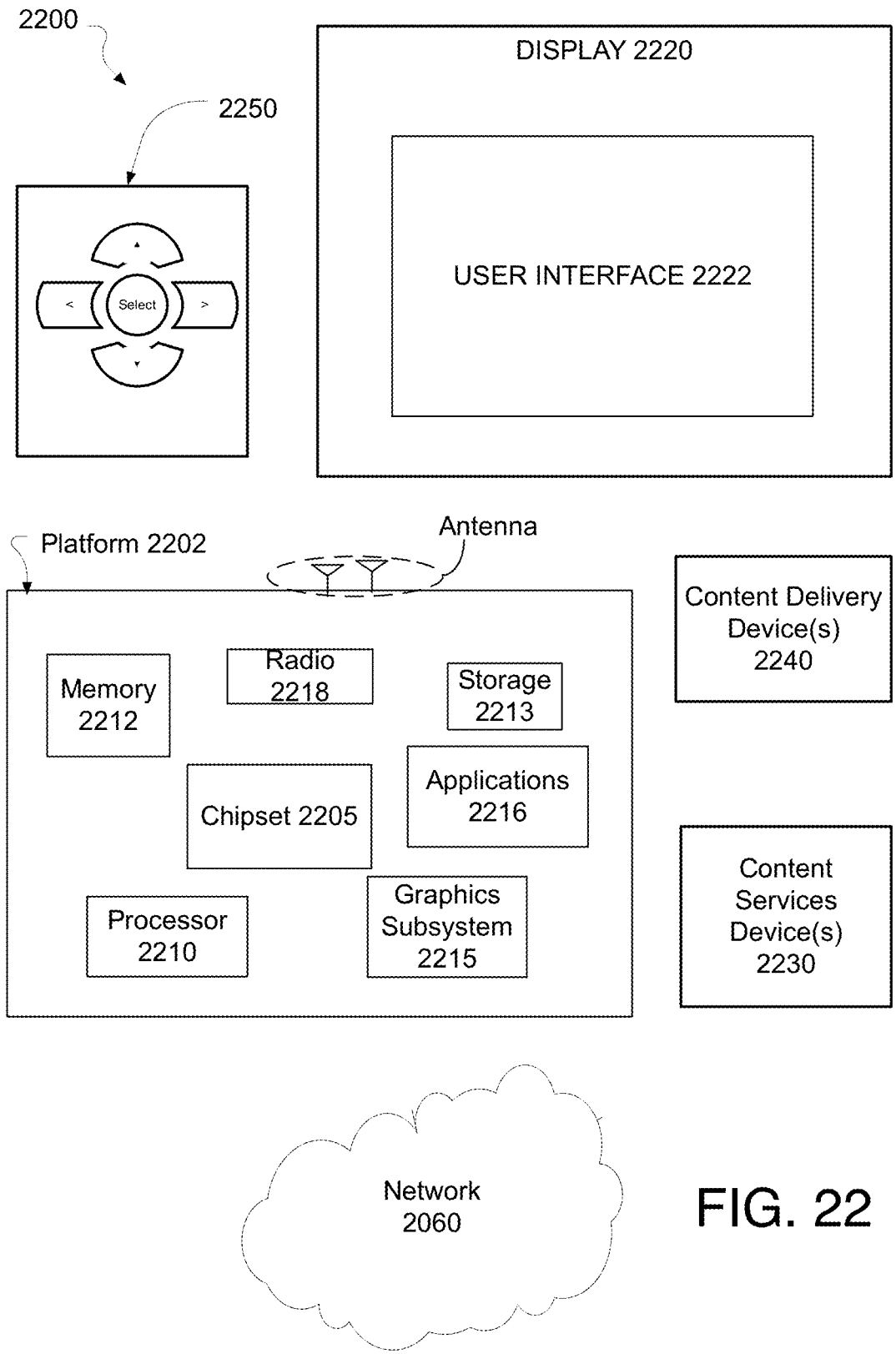
FIG. 22 is an illustrative diagram of an example system.

Referring to FIG. 22, an example system 2200 in accordance with the present disclosure operates one or more aspects of the image processing systems described herein and may operate or include system 2300. It will be understood from the nature of the system components described below that such components may be associated with, or used to operate, certain part or parts of the image processing system described above. In various implementations, system 2200 may be a media system although system 2200 is not limited to this context. For example, system 2200 may be incorporated into a digital still camera, digital video camera, mobile device with camera or video functions such as an imaging phone, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, dedicated access authorization device, physical lock device, face login device, object detection device, and so forth.

In various implementations, system 2200 includes a platform 2202 coupled to a display 2220. Platform 2202 may receive content from a content device such as content services device(s) 2230 or content delivery device(s) 2240 or other similar content sources. A navigation controller 2250 including one or more navigation features may be used to interact with, for example, platform 2202 and/or display 2220. Each of these components is described in greater detail below.

In various implementations, platform 2202 may include any combination of a chipset 2205, processor 2210, memory 2212, storage 2214, graphics subsystem 2215, applications 2216 and/or radio 2218. Chipset 2205 may provide intercommunication among processor 2210, memory 2212, storage 2214, graphics subsystem 2215, applications 2216 and/or radio 2218. For example, chipset 2205 may include a storage adapter (not depicted) capable of providing intercommunication with storage 2214.

Processor 2210 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 2210 may be dual-core processor(s), dual-core mobile processor(s), and so forth.

Memory 2212 may be implemented as a volatile memory device such as, but not limited to, a Random Access Memory (RAM), Dynamic Random Access Memory (DRAM), or Static RAM (SRAM).

Storage 2214 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 2214 may include technology to increase the storage performance enhanced protection for valuable digital media when multiple hard drives are included, for example.

Graphics subsystem 2215 may perform processing of images such as still or video for display. Graphics subsystem 2215 may be a graphics processing unit (GPU) or a visual processing unit (VPU), for example. An analog or digital interface may be used to communicatively couple graphics subsystem 2215 and display 2220. For example, the interface may be any of a High-Definition Multimedia Interface, Display Port, wireless HDMI, and/or wireless HD compliant techniques. Graphics subsystem 2215 may be integrated into processor 2210 or chipset 2205. In some implementations, graphics subsystem 2215 may be a stand-alone card communicatively coupled to chipset 2205.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 2218 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 818 may operate in accordance with one or more applicable standards in any version.

In various implementations, display 2220 may include any television type monitor or display. Display 2220 may include, for example, a computer display screen, touch screen display, video monitor, television-like device, and/or a television. Display 2220 may be digital and/or analog. In various implementations, display 2220 may be a holographic display. Also, display 2220 may be a transparent surface that may receive a visual projection. Such projections may convey various forms of information, images, and/or objects. For example, such projections may be a visual overlay for a mobile augmented reality (MAR) application. Under the control of one or more software applications 2216, platform 2202 may display user interface 2222 on display 2220.

In various implementations, content services device(s) 2230 may be hosted by any national, international and/or independent service and thus accessible to platform 2202 via the Internet, for example. Content services device(s) 2230 may be coupled to platform 2202 and/or to display 2220. Platform 2202 and/or content services device(s) 2230 may be coupled to a network 2260 to communicate (e.g., send and/or receive) media information to and from network 2260. Content delivery device(s) 2240 also may be coupled to platform 2202 and/or to display 2220.

In various implementations, content services device(s) 2230 may include a cable television box, personal computer, network, telephone, Internet enabled devices or appliance capable of delivering digital information and/or content, and any other similar device capable of unidirectionally or bidirectionally communicating content between content providers and platform 2202 and/display 2220, via network 2260 or directly. It will be appreciated that the content may be communicated unidirectionally and/or bidirectionally to and from any one of the components in system 2200 and a content provider via network 2260. Examples of content may include any media information including, for example, video, music, medical and gaming information, and so forth.

Content services device(s) 2230 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 2202 may receive control signals from navigation controller 2250 having one or more navigation features. The navigation features of controller 2250 may be used to interact with user interface 2222, for example. In implementations, navigation controller 2250 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 2250 may be replicated on a display (e.g., display 2220) by movements of a pointer, cursor, focus ring, or other visual indicators displayed on the display. For example, under the control of software applications 2216, the navigation features located on navigation controller 2250 may be mapped to virtual navigation features displayed on user interface 2222, for example. In implementations, controller 2250 may not be a separate component but may be integrated into platform 2202 and/or display 2220. The present disclosure, however, is not limited to the elements or in the context shown or described herein.

In various implementations, drivers (not shown) may include technology to enable users to instantly turn on and off platform 2202 like a television with the touch of a button after initial boot-up, when enabled, for example. Program logic may allow platform 2202 to stream content to media adaptors or other content services device(s) 2230 or content delivery device(s) 2240 even when the platform is turned "off." In addition, chipset 2205 may include hardware and/or software support for 8.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 2200 may be integrated. For example, platform 2202 and content services device(s) 2230 may be integrated, or platform 2202 and content delivery device(s) 2240 may be integrated, or platform 2202, content services device(s) 2230, and content delivery device(s) 2240 may be integrated, for example. In various implementations, platform 2202 and display 2220 may be an integrated unit. Display 2220 and content service device(s) 2230 may be integrated, or display 2220 and content delivery device(s) 2240 may be integrated, for example. These examples are not meant to limit the present disclosure.

In various implementations, system 2200 may be implemented as a wireless system, a wired system, or a combination of both. When implemented as a wireless system, system 2200 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 2200 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 2202 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 23.

Figure 23:
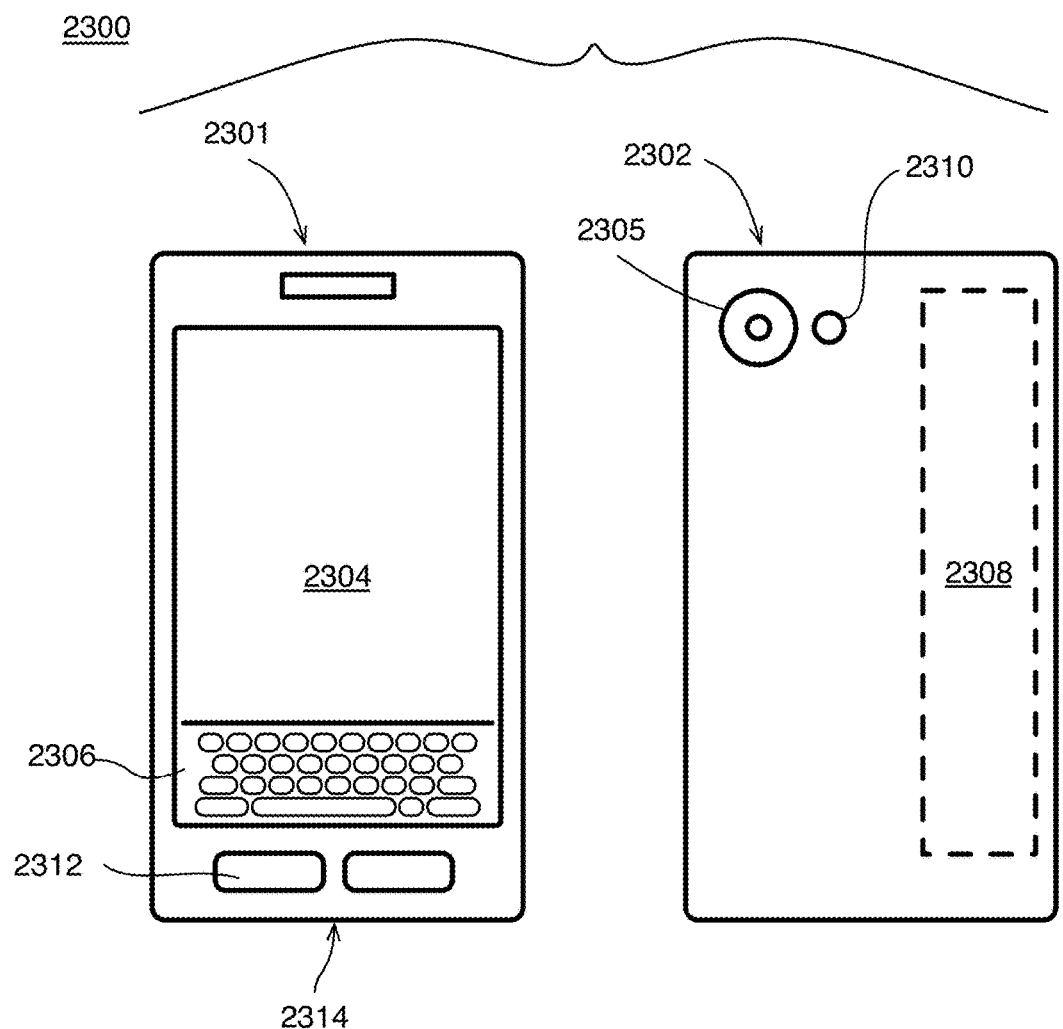
FIG. 23 is an illustrative diagram of an example system, all arranged in accordance with at least some implementations of the present disclosure.

Referring to FIG. 23, a small form factor device 2300 is one example of the varying physical styles or form factors in which systems 2100 or 2200 may be embodied. By this approach, device 2300 may be implemented as a mobile computing device having wireless capabilities. A mobile computing device may refer to any device having a processing system and a mobile power source or supply, such as one or more batteries, for example.

As described above, examples of a mobile computing device may include a digital still camera, digital video camera, mobile devices with camera or video functions such as imaging phones, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 23, device 2300 may include a housing with a front 2301 and a back 2302. Device 2300 includes a display 2304, an input/output (I/O) device 2306, and an integrated antenna 2308. Device 2300 also may include navigation features 2312. I/O device 2306 may include any suitable I/O device for entering information into a mobile computing device. Examples for I/O device 2306 may include an alphanumeric keyboard, a numeric keypad, a touch pad, input keys, buttons, switches, microphones, speakers, voice recognition device and software, and so forth. Information also may be entered into device 2300 by way of microphone 2314, or may be digitized by a voice recognition device. As shown, device 2300 may include a camera 2305 (e.g., including at least one lens, aperture, and imaging sensor) and an illuminator (which may or may not include a flash) 2310 integrated into back 2302 (or elsewhere) of device 2300. The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one example, a method of emitting light from an illuminator comprises emitting light from an illuminator having a light source with at least one vertical-cavity surface emitting laser (VCSEL); and driving current through the illuminator to generate light with at least two dominant output light wavelengths being sufficiently maintained and sufficiently different to each other to reduce speckle on an image to be formed by using the light from the at least one VCSEL.

By another implementation, the method also comprises wherein driving current comprises varying the amount of amperage to form the at least two light wavelengths, wherein the at least two light wavelengths have a difference of at least about 1 nm, wherein driving current comprises varying the amount of amperage between about 0.5-0.7 A to form one of the at least two wavelengths and between about 1.1-1.3 A to form another of the at least two wavelengths, and wherein driving current comprises driving power to turn power to the illuminator on and off in pulses; and changing the current level so that different pulses have different maximum current levels. The method also may comprise alternating between raising the current to an upper maximum level of current for a predetermined amount of time providing one or more pulses and to raising the current to a lower maximum level of current for a predetermined amount of time providing one or more pulses; and at least one of: (1) raising the current to the upper maximum level at intervals and for a single pulse, and providing a uniform time period having more than one pulse of the lower maximum level of current between consecutive single pulses with the upper maximum level; (2) driving the current and power to provide a plurality of groups of pulses between the consecutive single pulses, wherein each group has substantially the same frequency and substantially the same lower maximum level current within the same group, and (3) wherein one of the groups formed after one of the single pulses has a frequency sufficiently different from another group formed after another one of the single pulses so that the groups form multiple average wavelengths that are the at least two wavelengths sufficiently different to reduce speckle; and this option also may comprise driving current comprising driving current to vary the amount of amperage so that the one group has a different maximum current level compared to the maximum current level of the at least one other group to increase the difference in the at least two wavelengths in addition to the difference in wavelength provided by the change in frequency of the groups.

By yet another implementation, a light emitting system comprises an illuminator with a light source having at least one vertical-cavity surface emitting laser (VCSEL); a circuit to drive current through the illuminator to generate light; and a current driving unit communicatively connected to the circuit to control the circuit to emit light with at least two dominant output light wavelengths being sufficiently maintained and sufficiently different to each other to reduce speckle on an image to be formed by using the light from the at least one VCSEL.

By another example, the system further comprises comprising a metalayer disposed above at least one individual VCSEL to direct light to a predetermined radiation pattern with peaks at an emission image edge angle that provides the light that forms edges of an image formed by using the light; the system comprising an array of VCSELs and each VCSEL has a metalayer, wherein driving current comprises varying the amount of amperage to form the at least two light wavelengths, wherein the at least two light wavelengths have a difference of at least about 1 nm, wherein the difference in wavelength is set by adjusting the amplitude and width of electrical current pulses used to operate the illuminator.

By a further example, a light emitting device comprises an illuminator with a light source having at least one vertical-cavity surface emitting laser (VCSEL); and a circuit to drive current through the illuminator to generate light to emit light with at least two dominant output light wavelengths being sufficiently maintained and sufficiently different to each other to reduce speckle on an image to be formed by using the light.

The light emitting device also may include wherein the circuit has a variation in the amount of amperage between about 0.5-0.7 A to form one of the at least two wavelengths and between about 1.1-1.3 A to form another of the at least two wavelengths and to be at least about 1 nm different; wherein the circuit is arranged to drive the power of the illuminator to turn power to the illuminator on and off in pulses so that different pulses have different maximum current levels, and wherein the circuit alternates between raising the current to an upper maximum level of current for a predetermined amount of time providing one or more pulses and to raising the current to a lower maximum level of current for a predetermined amount of time providing one or more pulses. The device having at least one of: (1) wherein the circuit is arranged to raise the current to the upper maximum level for a single pulse at intervals, and to provide a uniform time period having more than one pulse of the lower maximum level of current between consecutive single pulses with the upper maximum level, (2) wherein the circuit is arranged to drive the current and power to provide a plurality of groups of pulses with one group between each pair of the consecutive single pulses, wherein each group has substantially the same frequency and substantially the same lower maximum level current within the same group, and (3) wherein one of the groups formed after one of the single pulses has a frequency sufficiently different from another group formed after another one of the single pulses so that the groups form multiple average wavelengths that are the at least two wavelengths sufficiently different to reduce speckle, and wherein the circuit is arranged to drive current to vary the amount of amperage so that the one group has a different maximum current level compared to the maximum current level of the at least one other group to increase the difference in the at least two wavelengths in addition to the difference in wavelength provided by the change in frequency of the groups.

By a further example, at least one article on a non-transitory computer-readable medium has instructions thereon that cause a light emitting device to operate by emitting light from an illuminator having a light source with at least one vertical-cavity surface emitting laser (VCSEL); and driving current through the illuminator to generate light with at least two dominant output light wavelengths being sufficiently maintained and sufficiently different to each other to reduce speckle on an image to be formed by using the light from the at least one VCSEL.

The instructions also may cause the light emitting device to operate by wherein driving current comprises varying the amount of amperage to form the at least two light wavelengths, wherein the at least two light wavelengths have a difference of at least about 1 nm, wherein driving current comprises varying the amount of amperage between about 0.5-0.7 A to form one of the at least two wavelengths and between about 1.1-1.3 A to form another of the at least two wavelengths, and wherein driving current comprises driving power to turn power to the illuminator on and off in pulses; and changing the current level so that different pulses have different maximum current levels. The instructions also may cause the light emitting device to operate by alternating between raising the current to an upper maximum level of current for a predetermined amount of time providing one or more pulses and to raising the current to a lower maximum level of current for a predetermined amount of time providing one or more pulses; and at least one of: (1) raising the current to the upper maximum level at intervals and for a single pulse, and providing a uniform time period having more than one pulse of the lower maximum level of current between consecutive single pulses with the upper maximum level; (2) driving the current and power to provide a plurality of groups of pulses between the consecutive single pulses, wherein each group has substantially the same frequency and substantially the same lower maximum level current within the same group, and (3) wherein one of the groups formed after one of the single pulses has a frequency sufficiently different from another group formed after another one of the single pulses so that the groups form multiple average wavelengths that are the at least two wavelengths sufficiently different to reduce speckle; and this option also may comprise driving current comprising driving current to vary the amount of amperage so that the one group has a different maximum current level compared to the maximum current level of the at least one other group to increase the difference in the at least two wavelengths in addition to the difference in wavelength provided by the change in frequency of the groups.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A method of emitting light from an illuminator, comprising:
   emitting light from an illuminator having a light source with at least one vertical-cavity surface emitting laser (VCSEL);
   driving current through the illuminator to generate light with at least two dominant output light wavelengths being sufficiently maintained and sufficiently different to each other to reduce speckle on an image to be formed by using the light from the at least one VCSEL; and
   providing power to turn the power to the illuminator on and off in pulses and comprising providing power to one group of consecutive pulses at a frequency different than the frequency of at least one other group of consecutive pulses to respectively form average wavelengths that are the at least two wavelengths.

2. The method of claim 1 wherein driving current comprises varying the amount of amperage to form the at least two light wavelengths.

3. The method of claim 1 wherein the at least two light wavelengths have a difference of at least about 1 nm.

4. The method of claim 1 wherein driving current comprises varying the amount of amperage between about 0.5-0.7 A to form one of the at least two wavelengths and between about 1.1-1.3 A to form another of the at least two wavelengths.

5. The method of claim 1 wherein driving current comprises driving power to turn power to the illuminator on and off in pulses; and changing the current level so that different pulses have different maximum current levels.

6. The method of claim 5 comprising alternating between raising the current to an upper maximum level of current for a predetermined amount of time providing one or more pulses and to raising the current to a lower maximum level of current for a predetermined amount of time providing one or more pulses.

7. The method of claim 6 comprising raising the current to the upper maximum level at intervals and for a single pulse; and providing a uniform time period having more than one pulse of the lower maximum level of current between consecutive single pulses with the upper maximum level.

8. The method of claim 7 comprising driving the current and power to provide a plurality of groups of pulses between the consecutive single pulses, wherein each group has substantially the same frequency and substantially the same lower maximum level current within the same group, and wherein one of the groups formed after one of the single pulses has a frequency sufficiently different from another group formed after another one of the single pulses so that the groups form multiple average wavelengths that are the at least two wavelengths sufficiently different to reduce speckle.

9. The method of claim 1 wherein driving current comprising driving current to vary the amount of amperage so that the one group has a different maximum current level compared to the maximum current level of the at least one other group to increase the difference in the at least two wavelengths in addition to the difference in wavelength provided by the change in frequency of the groups.

10. A light-emitting system comprising:
   an illuminator with a light source having at least one vertical-cavity surface emitting laser (VCSEL);
   a circuit to drive current through the illuminator to generate light;
   a current driving unit communicatively connected to the circuit to control the circuit to emit light with at least two dominant output light wavelengths being sufficiently maintained and sufficiently different to each other to reduce speckle on an image to be formed by using the light from the at least one VCSEL; and
   a metalayer disposed above at least one individual VCSEL to direct light to a predetermined radiation pattern with peaks at an emission image edge angle that provides the light that forms edges of an image formed by using the light.

11. The system of claim 10 comprising an array of VCSELs and each VCSEL has a metalayer.

12. The system of claim 10 wherein driving current comprises varying the amount of amperage to form the at least two light wavelengths.

13. The system of claim 10 wherein the at least two light wavelengths have a difference of at least about 1 nm.

14. The system of claim 10 wherein the difference in wavelength is set by adjusting the amplitude and width of electrical current pulses used to operate the illuminator.

15. The system of claim 10 wherein the circuit is arranged to drive power to turn power to the illuminator on and off in pulses; and the current driving unit is arranged to change the current level so that different pulses have different maximum current levels.

16. The system of claim 15 wherein the current driving unit is arranged to alternate between raising the current to an upper maximum level of current for a predetermined amount of time providing one or more pulses and to raise the current to a lower maximum level of current for a predetermined amount of time providing one or more pulses.

17. The system of claim 16 wherein the current driving unit is arranged to raise the current to the upper maximum level at intervals and for a single pulse; and provide a uniform time period having more than one pulse of the lower maximum level of current between consecutive single pulses with the upper maximum level.

18. A light-emitting device comprising:
   an illuminator with a light source having at least one vertical-cavity surface emitting laser (VCSEL); and
   a circuit to drive current through the illuminator to generate light to emit light with at least two dominant output light wavelengths being sufficiently maintained and sufficiently different to each other to reduce speckle on an image to be formed by using the light,
   wherein the circuit is arranged to drive the power of the illuminator to turn power to the illuminator on and off in pulses so that different pulses have different maximum current levels, and
   wherein the circuit is arranged to raise the current to an upper maximum level for a single pulse at intervals, and to provide a uniform time period having more than one pulse of the lower maximum level of current between consecutive single pulses with the upper maximum level.

19. The device of claim 18 wherein the circuit has a variation in the amount of amperage between about 0.5-0.7 A to form one of the at least two wavelengths and between about 1.1-1.3 A to form another of the at least two wavelengths and to be at least about 1 nm different.

20. The device of claim 18 wherein the circuit is arranged to drive the current and power to provide a plurality of groups of pulses with one group between each pair of the consecutive single pulses, wherein each group has substantially the same frequency and substantially the same lower maximum level current within the same group, and wherein one of the groups formed after one of the single pulses has a frequency sufficiently different from another group formed after another one of the single pulses so that the groups form multiple average wavelengths that are the at least two wavelengths sufficiently different to reduce speckle.

21. The device of claim 18 wherein the circuit is arranged to provide power to turn the power to the illuminator on and off in pulses, and comprising providing power to one group of consecutive pulses at a frequency different than the frequency of at least one other group of consecutive pulses to respectively form average wavelengths that are the at least two wavelengths.

22. The device of claim 21 wherein the circuit is arranged to drive current to vary the amount of amperage so that the one group has a different maximum current level compared to the maximum current level of the at least one other group to increase the difference in the at least two wavelengths in addition to the difference in wavelength provided by the change in frequency of the groups.

23. The device of claim 18 comprising a metalayer disposed above at least one individual VCSEL to direct light to a predetermined radiation pattern with peaks at an emission image edge angle that provides the light that forms edges of an image formed by using the light.

24. At least one article having a non-transitory computer-readable medium having instructions thereon that cause a light emitting device to operate by:

emitting light from an illuminator having a light source with at least one vertical-cavity surface emitting laser (VCSEL);

driving current through the illuminator to generate light with at least two dominant output light wavelengths being sufficiently maintained and sufficiently different to each other to reduce speckle on an image to be formed by using the light from the at least one VCSEL; and driving the power of the illuminator to turn power to the illuminator on and off in pulses so that the current is raised to an upper maximum level for a single pulse at intervals, and to provide a uniform time period having more than one pulse of the lower maximum level of current between consecutive single pulses with the upper maximum level.

25. The article of claim 24 wherein driving the current and power comprises driving the current and power to provide a plurality of groups of pulses with one group between each pair of the consecutive single pulses, wherein each group has substantially the same frequency and substantially the same lower maximum level current within the same group, and wherein one of the groups formed after one of the single pulses has a frequency sufficiently different from another group formed after another one of the single pulses so that the groups form multiple average wavelengths that are the at least two wavelengths sufficiently different to reduce speckle.

* * * * *